US012456413B2

(12) United States Patent
Yang et al.

(10) Patent No.: US 12,456,413 B2
(45) Date of Patent: Oct. 28, 2025

(54) CIRCUIT COMPONENT, ELECTRONIC DEVICE AND DRIVING METHOD

(71) Applicants: BOE MLED Technology Co., Ltd., Beijing (CN); BOE Technology Group Co., Ltd., Beijing (CN)

(72) Inventors: Tao Yang, Beijing (CN); Zhitao Zhang, Beijing (CN); Xiurong Wang, Beijing (CN); Qibing Gu, Beijing (CN); Mengmeng Wang, Beijing (CN); Yifan Hou, Beijing (CN); Shicai Cao, Beijing (CN)

(73) Assignees: BOE MLED Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/247,444

(22) PCT Filed: Apr. 28, 2022

(86) PCT No.: PCT/CN2022/090038

§ 371 (c)(1),
(2) Date: Mar. 30, 2023

(87) PCT Pub. No.: WO2023/206277

PCT Pub. Date: Nov. 2, 2023

(65) Prior Publication Data

US 2024/0363054 A1 Oct. 31, 2024

(51) Int. Cl.
*G09G 3/32* (2016.01)

(52) U.S. Cl.
CPC ....... *G09G 3/32* (2013.01); *G09G 2320/0233* (2013.01); *G09G 2320/0247* (2013.01); *G09G 2330/021* (2013.01)

(58) Field of Classification Search
CPC ... G09G 2320/0233; G09G 2320/0247; G09G 2330/021
See application file for complete search history.

(56) References Cited

U.S. PATENT DOCUMENTS 11,763,735 B2 * 9/2023 Akimoto .............. G09G 3/2081 345/691
12,039,921 B1 * 7/2024 Watsuda .............. G09G 3/2003
(Continued)

FOREIGN PATENT DOCUMENTS

CN 1375808 A 10/2002
CN 102044211 A 5/2011
(Continued)

*Primary Examiner* — Doon Y Chow
(74) *Attorney, Agent, or Firm* — ArentFox Schiff LLP; Michael Fainberg

(57) ABSTRACT

Embodiments of the present disclosure provide a circuit component, an electronic device and a driving method. The circuit component includes: an input end and at least one signal channel end, wherein the input end is configured to receive an $i^{th}$ image signal at a first frequency, and i is a positive integer. The circuit component includes a logic control circuit, configured to generate an $i^{th}$ drive control signal based on the $i^{th}$ image signal and repeatedly send the $i^{th}$ drive control signal at a second frequency, wherein the $i^{th}$ drive control signal is configured to control a current flowing through the at least one signal channel end.

19 Claims, 13 Drawing Sheets

(56) References Cited

U.S. PATENT DOCUMENTS

| | | | | |
|---|---|---|---|---|
| 12,073,763 | B2 * | 8/2024 | Gu | H01L 25/167 |
| 12,073,773 | B2 * | 8/2024 | Kwon | G09G 3/3266 |
| 2002/0126083 | A1 | 9/2002 | Cairns et al. | |
| 2014/0028645 | A1 * | 1/2014 | Yamazaki | G09G 3/36 345/96 |
| 2017/0206845 | A1 | 7/2017 | Sakariya et al. | |
| 2019/0172388 | A1 | 6/2019 | Saini et al. | |
| 2020/0135092 | A1 | 4/2020 | Ahmed | |
| 2023/0117873 | A1 * | 4/2023 | Kim | G09G 3/3233 345/55 |

FOREIGN PATENT DOCUMENTS

| | | | |
|---|---|---|---|
| CN | 102779480 | A * | 11/2012 |
| CN | 103165093 | A | 6/2013 |
| CN | 209149785 | U | 7/2019 |
| CN | 110277052 | A | 9/2019 |
| CN | 110570828 | A | 12/2019 |
| CN | 113257169 | A | 8/2021 |
| CN | 113781949 | A | 12/2021 |
| EP | 0194404 | A2 | 9/1986 |
| GB | 2418052 | A | 3/2006 |

* cited by examiner

Fig. 13
da1
SoT
ID
DCX
IoT
Rda1
Rda2
Rda3
Rda4
IoT
Gda1
Gda2
Gda3
Gda4
IoT
Bda1
Bda2
Bda3
Bda4
EoT

CIRCUIT COMPONENT, ELECTRONIC DEVICE AND DRIVING METHOD

CROSS-REFERENCE TO RELATED APPLICATIONS

This application is a National Stage of International Application No. PCT/CN2022/090038, filed Apr. 28, 2022, which is hereby incorporated by reference in its entirety.

FIELD

The present disclosure relates to the technical field of light emitting, in particular to a circuit component, an electronic device and a driving method.

BACKGROUND

Light-emitting diode (LED) display refers to a technology of transferring a traditional LED after arraying and miniaturization to a circuit substrate in an addressing and massive mode to form an ultra-small spacing LED, and further reducing a length of a millimeter-level LED to a micron level to achieve an ultra-high pixel and an ultra-high resolution, and be capable of theoretically adapting to screens of various sizes.

SUMMARY

A circuit component provided by an embodiment of the present disclosure includes: an input end and at least one signal channel end, wherein the input end is configured to receive an $i^{th}$ image signal at a first frequency, and i is a positive integer; and the circuit component includes a logic control circuit, configured to generate an $i^{th}$ drive control signal based on the $i^{th}$ image signal and repeatedly send the $i^{th}$ drive control signal at a second frequency, wherein the $i^{th}$ drive control signal is configured to control a current flowing through the at least one signal channel end.

In some examples, the logic control circuit includes: a counter circuit, configured to count a first number of repeated sending of the $i^{th}$ drive control signal; a buffer circuit, configured to store the image signal; and a first processing circuit, coupled with the input end, the counter circuit and the buffer circuit; wherein the first processing circuit is configured to: judge whether the first number reaches a set number and whether the input end receives an $(i+1)^{th}$ image signal; and store the $(i+1)^{th}$ image signal to the buffer circuit when it is judged that the first number is less than the set number and the input end receives the $(i+1)^{th}$ image signal.

In some examples, the first processing circuit is further configured to: continue to repeatedly send, when it is judged that the first number is less than the set number and the input end receives the $(i+1)^{th}$ image signal, the $i^{th}$ drive control signal at the second frequency until the first number is equal to the set number, and read the $(i+1)^{th}$ image signal from the buffer circuit.

In some examples, the logic control circuit further includes: a register circuit, configured to store the $i^{th}$ image signal; and the first processing circuit is further configured to: clear the $i^{th}$ image signal stored in the register circuit when the first number is equal to the set number, and transfer the $(i+1)^{th}$ image signal stored in the buffer circuit into the register circuit.

In some examples, the first processing circuit is further configured to: continue to repeatedly send, when it is judged that the first number is equal to the set number and the input end does not receive the $(i+1)^{th}$ image signal, the $i^{th}$ drive control signal at the second frequency until the input end receives the $(i+1)^{th}$ image signal.

In some examples, the first processing circuit further includes: the register circuit, configured to store the $i^{th}$ image signal; and the first processing circuit is further configured to: clear the $i^{th}$ image signal stored in the register circuit when it is judged that the first number is greater than the set number and the input end receives the $(i+1)^{th}$ image signal, and directly store the $(i+1)^{th}$ image signal into the register circuit.

In some examples, the first processing circuit further includes: the register circuit, configured to store the $i^{th}$ image signal; and the first processing circuit is further configured to: clear the $i^{th}$ image signal stored in the register circuit when it is judged that the first number is equal to the set number and the input end receives the $(i+1)^{th}$ image signal, and store the $(i+1)^{th}$ image signal into the register circuit.

In some examples, the counter circuit is configured to count the number of sending times of the $i^{th}$ drive control signal from 1.

In some examples, the first processing circuit is further configured to: send the $i^{th}$ drive control signal and send a count trigger signal to the counter circuit each time when the $i^{th}$ drive control signal is sent; and send a count reset signal to the counter circuit when the $(i+1)^{th}$ drive control signal is first sent; and the counter circuit is further configured to count in response to the count trigger signal and to recount from 1 in response to the count reset signal.

In some examples, the first processing circuit is further configured to: obtain the first number counted by the counter circuit after sending the $i^{th}$ drive control signal each time.

In some examples, the circuit component further includes a drive control circuit; and the drive control circuit includes an input pin and an output pin, the logic control circuit is coupled with the input pin of the drive control circuit, the input pin is configured to receive the $i^{th}$ drive control signal at the second frequency, and the output pin is the signal channel end of the circuit component.

In some examples, the first processing circuit is further configured to: generate a horizontal synchronizing signal and send the $i^{th}$ drive control signal to the drive control circuit when a set edge of the horizontal synchronizing signal appears, wherein the set edge is one of a rising edge or a falling edge.

In some examples, the horizontal synchronizing signal and the count trigger signal are the same signal.

An electronic device provided by an embodiment of the present disclosure includes the circuit component described above.

A driving method provided by an embodiment of the present disclosure is applied to a circuit component, the circuit component includes an input end and at least one signal channel end, and the input end is configured to receive an $i^{th}$ image signal at a first frequency; and the driving method includes: generating an $i^{th}$ drive control signal based on the $i^{th}$ image signal and repeatedly sending the $i^{th}$ drive control signal at a second frequency, wherein the $i^{th}$ drive control signal is configured to control a current flowing through the at least one signal channel end, and i is a positive integer.

DETAILED DESCRIPTION OF THE EMBODIMENTS

In order to make objectives, technical solutions and advantages of the embodiments of the present disclosure clearer, the technical solutions of the embodiments of the present disclosure will be described clearly and completely with reference to accompanying drawings of the embodiments of the present disclosure. Apparently, the described embodiments are part of the embodiments of the present disclosure, but not all the embodiments. The embodiments in the present disclosure and features in the embodiments may be mutually combined in the case of no conflict. On the basis of the described embodiments of the present disclosure, all other embodiments obtained by those ordinarily skilled in the art without inventive efforts fall within the protection scope of the present disclosure.

Unless otherwise defined, the technical or scientific terms used in the present disclosure shall have the usual meanings understood by a person of ordinary skill in the art to which the present disclosure belongs. The words "first", "second" and the like used in the present disclosure do not indicate any order, quantity or importance, but are only used to distinguish different components. The word "including" or "containing" and the like, means that an element or item preceding the word covers an element or item listed after the word and the equivalent thereof, without excluding other elements or items. The word "coupling" or "connecting" and the like is not restricted to physical or mechanical coupling, but may include electrical coupling, whether direct or indirect.

It should be noted that sizes and shapes of all graphs in the accompanying drawings do not reflect the true scale, and only intend to illustrate the content of the present disclosure. The same or similar reference numbers represent the same or similar elements or elements with the same or similar functions from beginning to end.

During specific implementation, in an embodiment of the present disclosure, an electronic device may be a display apparatus, and a functional unit is a pixel unit. Exemplarily, the display apparatus may be: any product or component with a display function, such as a mobile phone, a tablet computer, a television, a displayer, a notebook computer, a digital photo frame, and a navigator. It should be understood by a person of ordinary skill in the art that the display apparatus should have other essential constituent parts, which is not repeated here and should not be regarded as limitation to the present disclosure.

Figure 1:
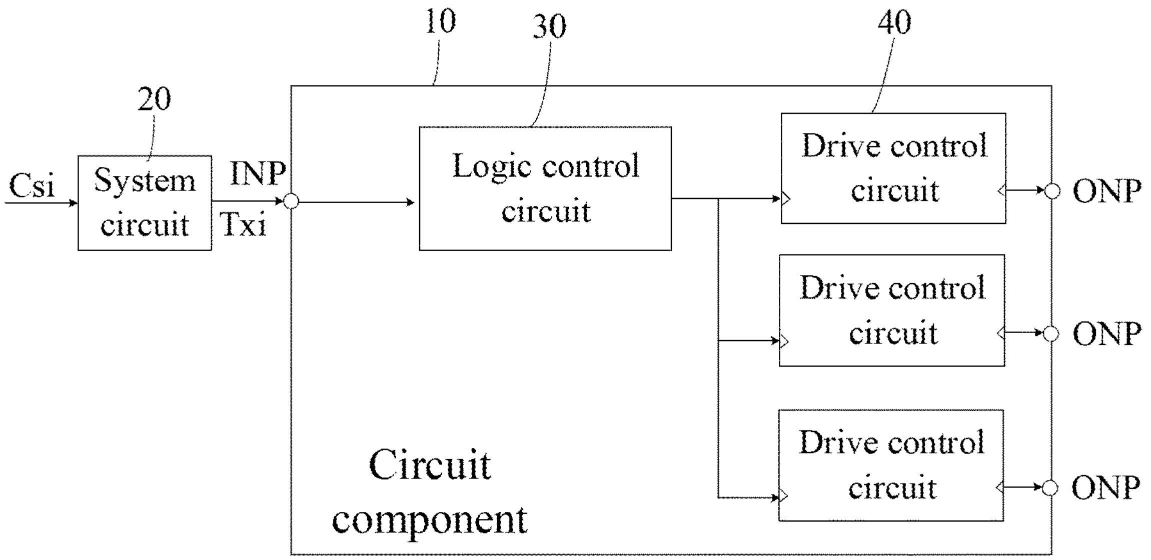
FIG. 1 illustrates some schematic structural diagrams of an electronic device provided by an embodiment of the present disclosure.

As shown in FIG. 1, the electronic device includes a system circuit 20 and a circuit component 10. Exemplarily, the circuit component 10 includes: an input end INP, a logic control circuit 30, and at least one signal channel end ONP. The input end INP is configured to receive an $i^{th}$ image signal Txi at a first frequency. The logic control circuit 30 generates an $i^{th}$ drive control signal based on the $i^{th}$ image signal Txi and repeatedly send the $i^{th}$ drive control signal at a second frequency, wherein the $i^{th}$ drive control signal is configured to control a current flowing through the at least one signal channel end ONP.

Exemplarily, when the electronic device is a display apparatus, it may display a picture in a plurality of display frames during working. Each display frame includes a plurality of display subframes, and the $i^{th}$ image signal Txi is an image signal of the picture to be displayed in an $i^{th}$ display frame sent by the system circuit 20. The $i^{th}$ drive control signal is a drive control signal of each display subframe in the $i^{th}$ display frame sent by the logic control circuit 30. During specific implementation, the system circuit 20 receives an initial signal Csi related to the display picture of the $i^{th}$ display frame from a television network interface and the like, generates the $i^{th}$ image signal Txi after performing a series of processing such as rendering and decoding on the initial signal Csi, and outputs the $i^{th}$ image signal Txi based on the first frequency. After the input end INP of the circuit component 10 receives the $i^{th}$ image signal Txi at the first frequency, the $i^{th}$ image signal Txi is input into the logic control circuit 30. The logic control circuit 30 generates the $i^{th}$ drive control signal according to the received $i^{th}$ image signal Txi, and outputs the $i^{th}$ drive control signal based on the second frequency.

In some embodiments of the present disclosure, as shown in FIG. 1, the circuit component 10 further includes a drive control circuit 40. The drive control circuit 40 includes an input pin and an output pin, the logic control circuit 30 is coupled with the input pin of the drive control circuit 40, the input pin is configured to receive the $i^{th}$ drive control signal at the second frequency, and the output pin is the signal channel end ONP of the circuit component 10.

Figure 2:
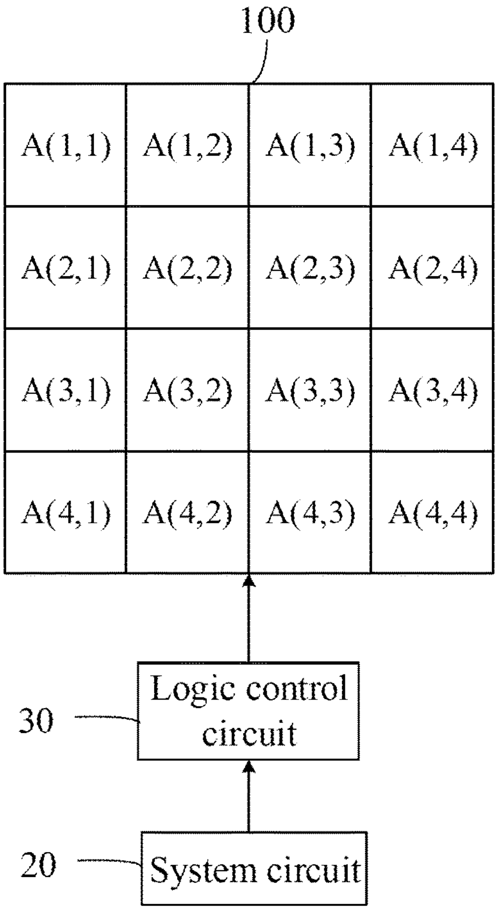
FIG. 2 illustrates some other schematic structural diagrams of an electronic device provided by an embodiment of the present disclosure.

In some embodiments of the present disclosure, as shown in FIG. 2, the electronic device includes the plurality of drive control circuits arranged in M rows and N columns. For example, when N=4 and M=4, the plurality of drive control circuits may be arranged into four rows and four columns. According to a physical position of each drive control circuit on a base substrate, they are marked as: A (1, 1), A (1, 2), A (1, 3), A (1, 4), A (2, 1), A (2, 2), A (2, 3), A (2, 4), A (3, 1), A (3, 2), A (3, 3), A (3, 4), A (4, 1), A (4, 2), A (4, 3), A (4, 4). It should be noted that FIG. 2 is only a possible illustration of a position of the drive control circuit on the base substrate. In practical applications, the quantity of the drive control circuits (that is, specific values of N and M) may be determined according to needs of the practical applications, which is not limited here.

Figure 3:
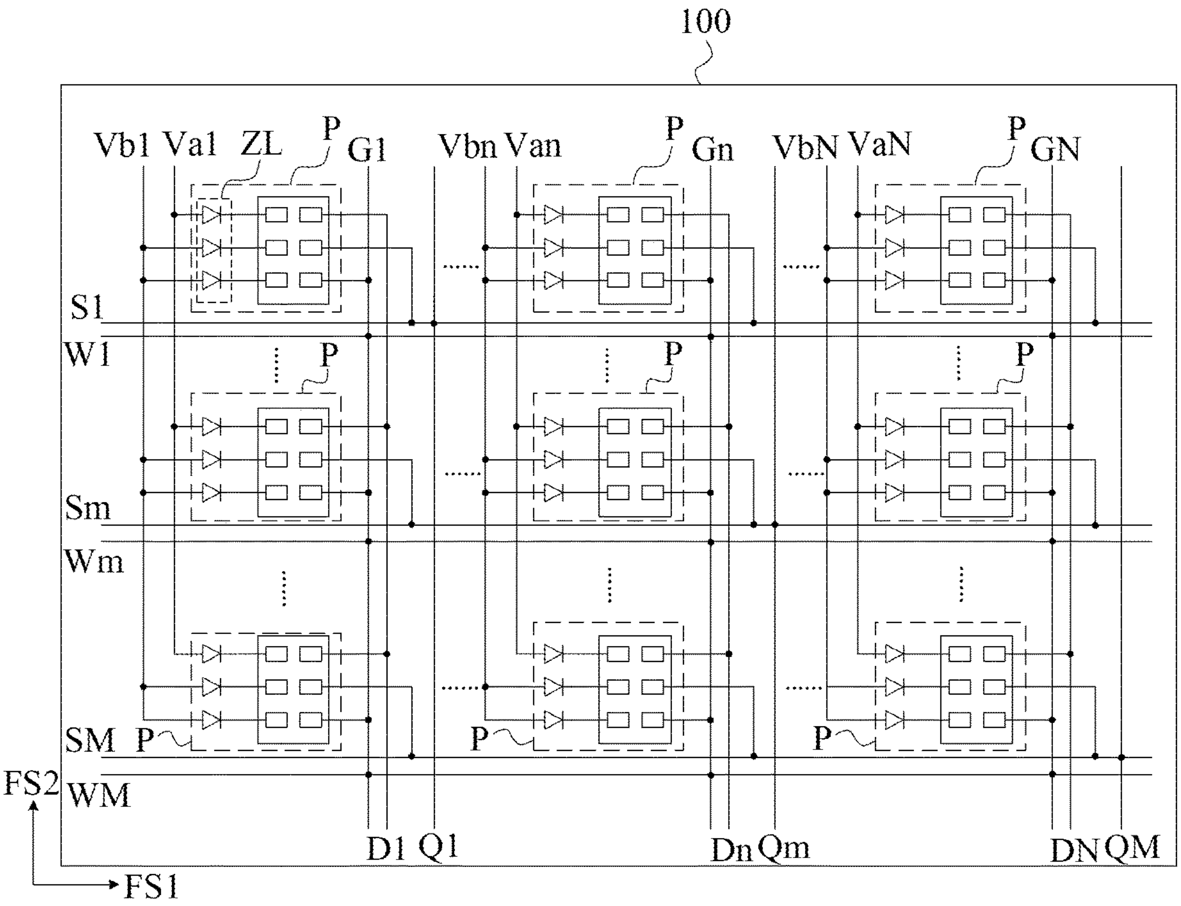
FIG. 3 illustrates some schematic structural diagrams of a display panel provided by an embodiment of the present disclosure.
Figure 4:
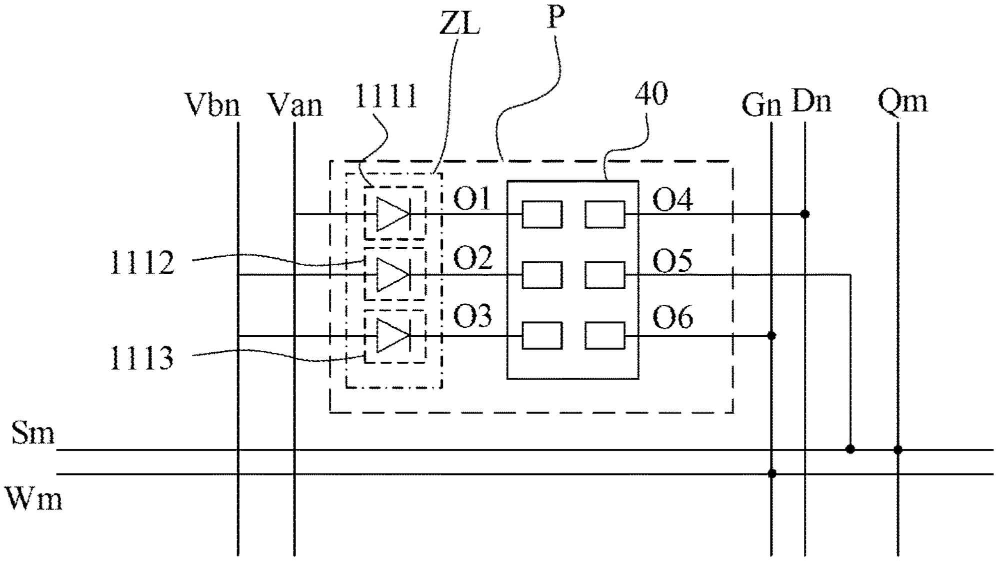
FIG. 4 illustrates some schematic local structural diagrams of a display panel provided by an embodiment of the present disclosure.
Figure 5:
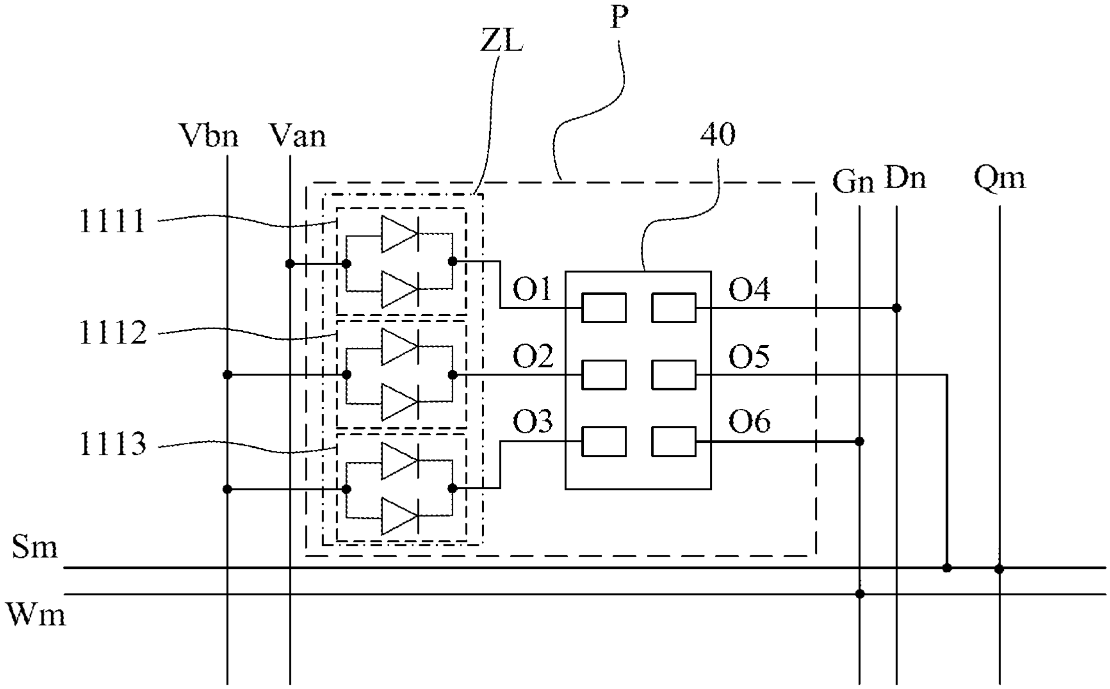
FIG. 5 illustrates some other schematic local structural diagrams of a display panel provided by an embodiment of the present disclosure.
Figure 6:
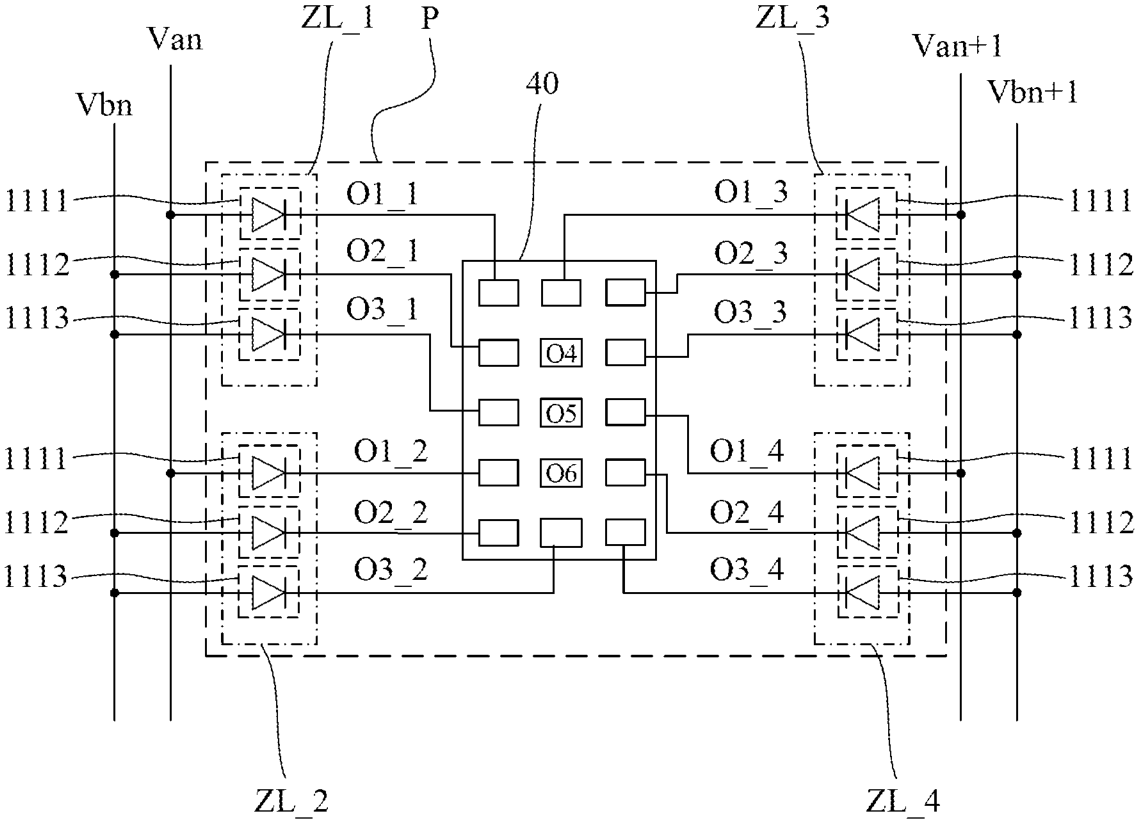
FIG. 6 illustrates some another schematic local structural diagrams of a display panel provided by an embodiment of the present disclosure.

In some embodiments of the present disclosure, the electronic device further includes a plurality of device groups. A first end of one device group may be coupled with a positive pole signal line, and a second end of the device group may be coupled with one signal channel end ONP (such as the output pin of the drive control circuit 40) of the circuit component. As shown in FIG. 3 to FIG. 5, one device group ZL and one drive control circuit 40 constitute one functional unit P. In each functional unit P, the first end of the device group ZL is coupled with the positive pole signal line, and the second end of the device group ZL is coupled with the output pin of the drive control circuit 40. As shown in FIG. 6, the four device groups ZL_1-ZL_4 and one drive control circuit 40 constitute one functional unit P. In each functional unit P, the first ends of the device groups ZL_1-ZL_4 are coupled with the positive pole signal line, and the second ends of the device groups ZL_1-ZL_4 are respectively coupled with the different output pins of the drive control circuit 40. The present disclosure does not limit the quantity of device groups in each functional unit. In some embodiments of the present disclosure, one device group includes at least one device. For example, one device group includes the plurality of devices. Exemplarily, the device may be set as a light-emitting device, and thus one device group may include at least one light-emitting device. For example, the first ends of the device groups may be positive poles of the light-emitting devices, and the second ends may be a negative pole of at least one light-emitting device. For example, as shown in FIG. 3 to FIG. 6, each device group may include the three light-emitting devices (such as 1111 to 1113). Of course, in practical application, functional types and the specific quantity of the devices in the device groups may be determined according to the needs of the practical applications, which is not limited here. Illustration is made below by taking an example that each device group may include the light-emitting devices.

In some embodiments of the present disclosure, one device group ZL includes the plurality of devices. In a case that one drive control circuit controls one device group, the quantity of the output pins of the drive control circuit 40 may be the same as the quantity of the devices in the device group ZL. Exemplarily, as shown in FIG. 3 and FIG. 4, if one device group ZL includes the three light-emitting devices, the drive control circuit 40 may have the three output pins, and one output pin is coupled with the negative pole of one light-emitting device. Of course, it is not limited to this. Exemplarily, as shown in FIG. 5, one device group ZL includes the six light-emitting devices, but the six light-emitting devices are divided into three groups. If the two light-emitting devices in each group are connected in parallel, the drive control circuit 40 may still have only three output pins, and one output pin is simultaneously coupled with the negative poles of the two light-emitting devices in a parallel relationship.

In some embodiments of the present disclosure, in a case that one drive control circuit controls the plurality of device groups, the quantity of the output pins of the drive control circuit 40 may be related to the quantity of all the devices in the plurality of device groups ZL. Exemplarily, as shown in FIG. 6, one drive control circuit controls the four device groups ZL_1-ZL_4, each device group includes the three light-emitting devices, thus the drive control circuit 40 has the twelve output pins, and one output pin is coupled with the negative pole of one light-emitting device.

In some embodiments of the present disclosure, as shown in FIG. 3, the electronic device may further include: a plurality of first positive pole signal lines Va1 . . . Van . . . VaN (1≤n≤N, and n is an integer), a plurality of second positive pole signal lines Vb1 . . . Vbn . . . VbN, a plurality of reference signal lines G1 . . . Gn . . . GN, a plurality of location signal lines S1 . . . Sm . . . SM (1≤m≤M, and m is an integer), a plurality of location signal transfer lines Q1 . . . Qm . . . QM, a plurality of drive signal lines D1 . . . Dn . . . DN, and a plurality of auxiliary signal lines W1 . . . Wm . . . WM. Exemplarily, it is possible to make one column of functional units corresponds to at least one first positive pole signal line among the plurality of first positive pole signal lines, at least one second positive pole signal line among the plurality of second positive pole signal lines, at least one reference signal line among the plurality of reference signal lines, and at least one drive signal line among the plurality of drive signal lines. Moreover, it is impossible to make one row of functional units corresponds to at least one location signal line among the plurality of location signal lines, at least one auxiliary signal line among the plurality of auxiliary signal lines, and at least one location signal transfer line among the plurality of location signal transfer lines. For example, it is possible to make one column of functional units corresponds to one first positive pole signal line, one second positive pole signal line, one reference signal line, and one drive signal line. Moreover, it is impossible to make one row of functional units corresponds to one location signal line, one auxiliary signal line, and one location signal transfer line. Optionally, each first positive pole signal line, each second positive pole signal line, each reference signal line and each drive signal line may be set in a gap between the two adjacent functional unit columns. Each location signal line, each auxiliary signal line and each location signal transfer line may be set in a gap between the two adjacent functional unit rows. Of course, in practical applications, a corresponding mode of the functional units and the above signal lines may be determined according to the needs of the practical applications, which is not limited here.

In some embodiments of the present disclosure, as shown in FIG. 3, each auxiliary signal line Wm may be coupled with the at least one reference signal line Gn to reduce resistance of the reference signal line Gn, reduce voltage drop of the reference signal line Gn, and reduce signal delay on the reference signal line Gn. In addition, all the location signal transfer lines Qm and the location signal lines Sm may be set in a one-to-one correspondence mode. For example, each auxiliary signal line Wm may be coupled with the corresponding reference signal line Gn, the location signal transfer lines Q1 are correspondingly coupled with the location signal lines S1, the location signal transfer lines Qm are correspondingly coupled with the location signal lines Sm, and the location signal transfer lines QM are correspondingly coupled with the location signal lines SM.

In some embodiments of the present disclosure, a first positive pole voltage VLED1 may be transmitted on the first positive pole signal line Van, a second positive pole voltage VLED2 may be transmitted on the second positive pole signal line Vbn, a reference voltage VSS may be transmitted on the reference signal line Gn, a power supply voltage VCC and location information may be transmitted on the location signal line Sm, and the drive control signal may be transmitted on the drive signal line Dn.

In some embodiments of the present disclosure, as shown in FIG. 3 to FIG. 8, each device group may include three different colors of light-emitting devices (such as a first-color light-emitting device 1111, a second-color light-emitting device 1112, and a third-color light-emitting device 1113). The drive control circuit 40 may have output pins O1-O3, an input pin O4, an addressing pin O5 and a reference signal pin O6. The output pin O1 is coupled with a negative pole R− of the first-color light-emitting device 1111, the output pin O2 is coupled with a negative pole G− of the second-color light-emitting device 1112, the output pin O3 is coupled with a negative pole B− of the third-color light-emitting device 1113, the input pin O4 is coupled with the drive signal line Dn through a first via hole p1, the addressing pin O5 is coupled with the location signal line Sm, the reference signal pin O6 is coupled with the reference signal line Gn through a first via hole p2, and the auxiliary signal line Wm is coupled with the reference signal line Gn through a first via hole p5. A positive pole R+ of the first-color light-emitting device 1111 is coupled with the first positive pole signal line Van, a positive pole G+ of the second-color light-emitting device 1112 is coupled with the second positive signal line Vbn through a first via hole p4, and a positive pole B+ of the third-color light-emitting device 1113 is coupled with the second positive pole signal line Vbn through the first via hole p4. The location signal line Sm is coupled with the location signal transfer line Qm through a first via hole p3. It should be noted that in order to clearly highlight a connection relationship of each structure, FIG. 7 only shows terminals (such as, O1-O6) of the drive control circuit 40 and the positive poles and the negative poles (such as, R+, R−, G+, G−, B+, B−) of the light-emitting device, and the drive control circuit 40 and a main part of the light-emitting device are omitted.

In some embodiments of the present disclosure, the first-color light-emitting device 1111 may be a red light-emitting device, the second-color light-emitting device 1112 may be a green light-emitting device, and a third-color light-emitting device 1113 may be a blue light-emitting device. When driving the red light-emitting device, the green light-emitting device and the blue light-emitting device to emit light of the same brightness, a voltage required to be applied by the positive pole R+ of the red light-emitting device is generally greater than a voltage required to be applied by the positive pole G+ of the green light-emitting device and a voltage required to be applied by the positive pole B+ of the blue light-emitting device. Therefore, if the positive poles of the red light-emitting device, the green light-emitting device and the blue light-emitting device are coupled to the same positive pole signal line, the voltage that needs to be loaded on the positive pole signal line will be relatively large, which not only increases power consumption, but also makes the voltage loaded by the positive poles of the green light-emitting device and the blue light-emitting device too large, reducing its service life. Therefore, the first positive pole signal line Van and the second positive pole signal line Vbn are set respectively, the positive pole R+ of the red light-emitting device is coupled with the first positive pole signal line Van, and the positive pole G+ of the green light-emitting device and the positive pole B+ of the blue light-emitting device are coupled with the second positive pole signal line Vbn. In practical applications, the first positive pole voltage VLED1 applied on the first positive pole signal line Van may be higher than the second positive pole voltage VLED2 applied on the second positive pole signal line Vbn, which can not only enable the red light-emitting device to achieve its light-emitting brightness, but also reduce the power consumption and improve the service life of the green light-emitting device and the blue light-emitting device.

In some examples, as shown in FIG. 3, FIG. 4, FIG. 7 and FIG. 8, the base substrate 010 has a buffer layer 011 located on the base substrate 010, a first metal layer 012 located on one side of the buffer layer 011 facing away from the base substrate 010, an insulating layer 013 located on one side of the first metal layer 012 facing away from the base substrate 010, a second metal layer 014 located on one side of the insulating layer 013 facing away from the base substrate 010, a flat layer 015 located on one side of the second metal layer 014 facing away from the base substrate 010, and a passivation layer 016 located on one side of the flat layer 015 facing away from the base substrate 010. Moreover, the light-emitting devices and the drive control circuit 40 are arranged on one side of the passivation layer 016 facing away from the base substrate 010.

In some examples, as shown in FIG. 3, FIG. 4, FIG. 7 and FIG. 8, the first metal layer 012 may include the plurality of first positive pole signal lines Van, the plurality of second positive pole signal lines Vbn, the plurality of reference signal lines Gn, the plurality of location signal transfer lines Qm and the plurality of drive signal lines Dn, which are arranged separating from each other. Exemplarily, the plurality of first positive pole signal lines Van, the plurality of second positive pole signal lines Vbn, the plurality of reference signal lines Gn, the plurality of location signal transfer lines Qm and the plurality of drive signal lines Dn may be arranged in a first direction FS1 and extend in a second direction FS2. Exemplarily, the second direction FS2 is set perpendicular to the first direction FS1. In practical applications, the second direction FS2 may be a column direction, and the first direction FS1 may be a row direction. Or, the second direction FS2 may be the row direction, and the first direction FS1 may be the column direction.

Figure 7:
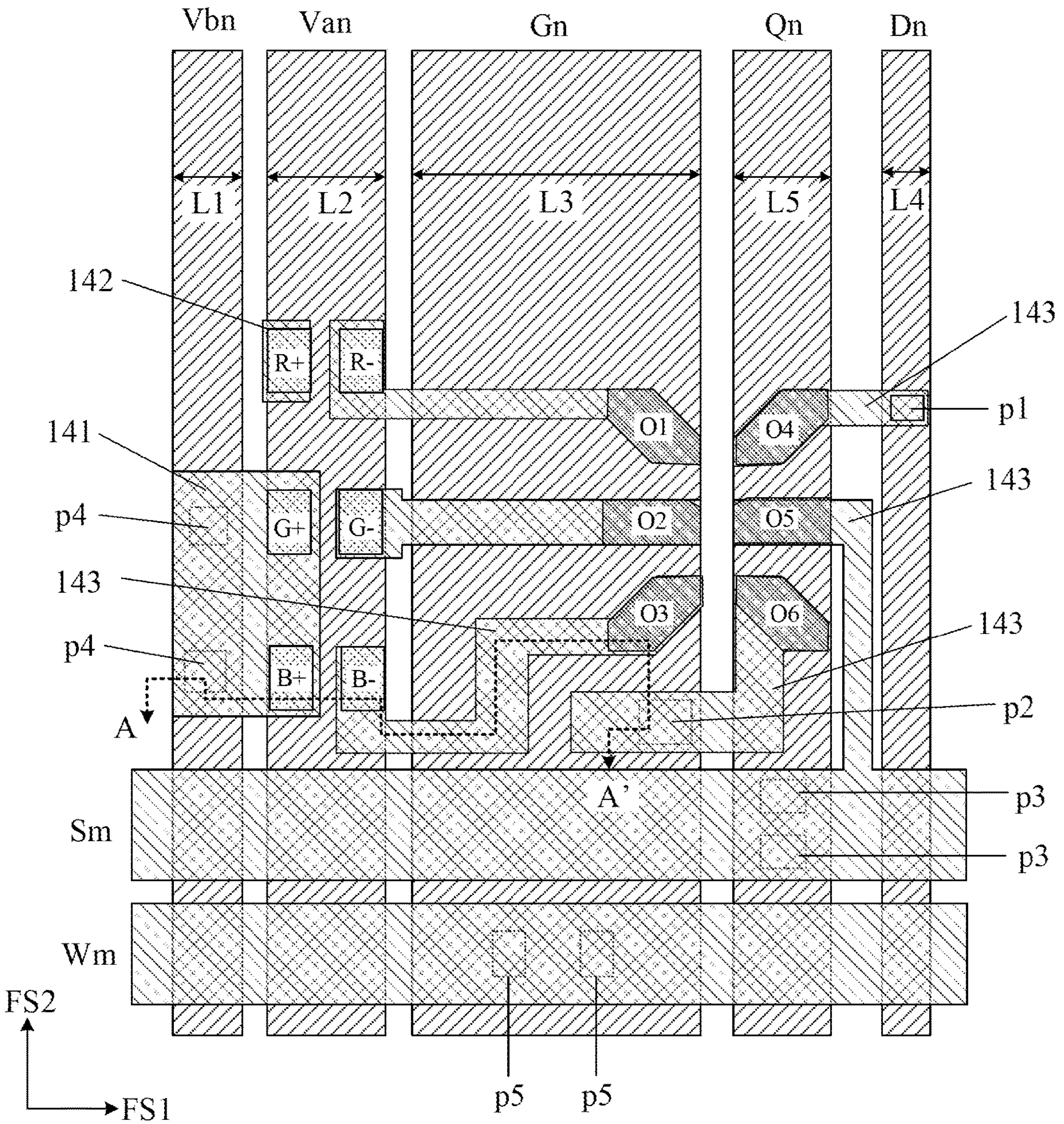
FIG. 7 illustrates some schematic layout structural diagrams of a display panel provided by an embodiment of the present disclosure.
Figure 8:
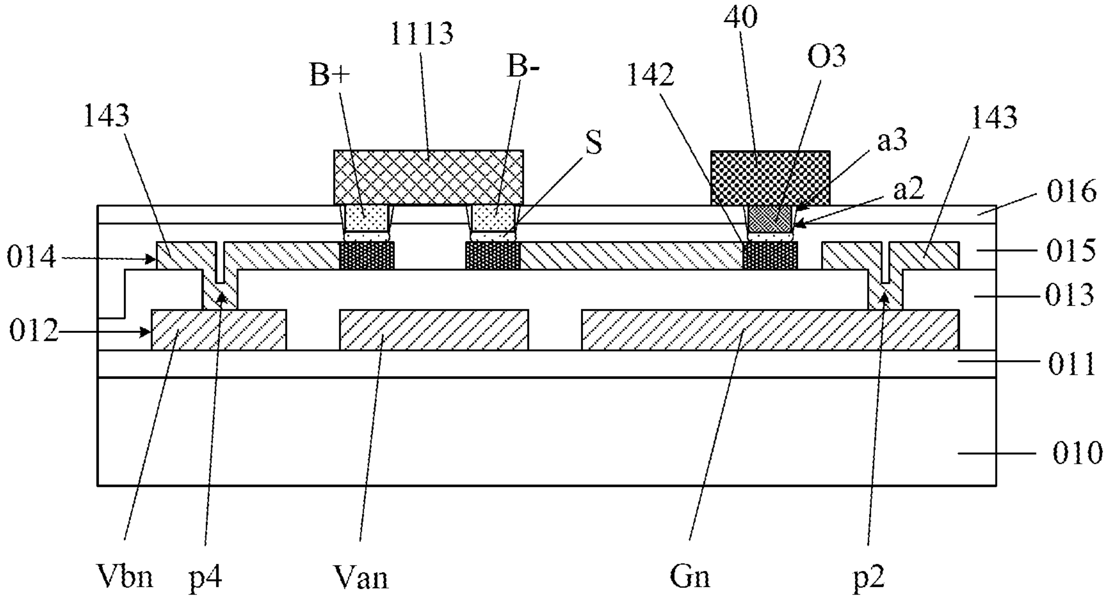
FIG. 8 illustrates a schematic diagram of a sectional structure in a direction AA' in the schematic diagram of the layout structure shown in FIG. 7.

Exemplarily, as shown in FIG. 7 and FIG. 8, the second metal layer 014 may include a plurality of signal connecting parts 141, a plurality of connecting bonding pads 142 and a plurality of connecting wires 143. Exemplarily, the plurality of connecting bonding pads 142 may be used to connect the light-emitting devices and the drive control circuit 40. It should be noted that part of the connecting wires 143 may be coupled with the reference signal lines Gn through the first via hole p2, part of the connecting wires 143 may be coupled with the drive signal lines Dn through the first via hole p1, and part of the connecting wires 143 may be coupled with the location signal lines Sm.

In some embodiments, the different types of signal lines have different linewidths because of the different types of signals transmitted by them. If the signal lines extend in the first direction FS1, a width of the signal lines refers to a width of the signal lines in a direction perpendicular to its main body extension direction (such as the second direction FS2). For example, as shown in FIG. 7, a width of the reference signal line Gn is greater than a width of the drive signal line Dn.

Exemplarily, as shown in FIG. 7 and FIG. 8, the flat layer 015 includes a plurality of second via holes a2, and the plurality of second via holes a2 penetrate through the flat layer 015 to expose the second metal layer 014. The passivation layer 016 may include a plurality of third via holes a3, and the plurality of third via holes a3 penetrate into the flat layer 015. One third via hole a3 corresponds to one second via hole a2 in position, to form a penetrate-through via hole penetrating from the passivation layer 016 to the connecting bonding pad 142 of the second metal layer 014. For example, the light-emitting devices may be connected with the two connecting bonding pads 142 through the penetrate-through via hole penetrating through the flat layer 015 and the passivation layer 016, and the drive control circuit 40 are connected with the six connecting bonding pads 142 through the penetrate-through via hole penetrating through the flat layer 015 and the passivation layer 016, so as to drive the light-emitting devices to emit light under control of signals transmitted by the signal lines and the drive control circuit 40.

Exemplarily, as shown in FIG. 7 and FIG. 8, the positive poles and the negative poles of the light-emitting devices, and the output pins O1-O3, the input pin O4, the addressing pin O5 and the reference signal pin O6 of the drive control circuit 40 may be coupled with the corresponding connecting bonding pads 142 through a welding material S (such as solder, a tin-silver-copper alloy, and a tin-copper alloy). For example, the output pins O3 of the drive control circuit 40 may be coupled with one connecting bonding pad 142 through the welding material S, the negative pole B− of the third-color light-emitting device 1113 may also be coupled with one connecting bonding pad 142 through the welding material S, and the connecting bonding pad 142 coupled with the negative pole B− may be coupled with the connecting bonding pad 142 coupled with the coupling reference signal pin O6 through the connecting wire 143. The positive pole B+ of the third-color light-emitting device 1113 may also be coupled with one connecting bonding pad 142 through the welding material S, the connecting bonding pad 142 coupled with the positive pole B+ may be coupled with one signal connecting part 141, and the signal connecting part 141 may be coupled with the first positive pole signal line Va1 through the first via hole p4. The reference signal pin O6 of the drive control circuit 40 may also be coupled with one connecting bonding pad 142 through the welding material S, the connecting bonding pad 142 coupled with the reference signal pin O6 is coupled with one connecting wire 143, and the connecting wire 143 may be coupled with the reference signal line Gn through the first via hole p2.

Exemplarily, as shown in FIG. 7 and FIG. 8, each first positive pole signal line Van is not a signal line with the same width everywhere. In order to facilitate reasonable layout of the signal lines, the width of the first positive pole signal line Van is wider in some places, and narrower in some places. In some embodiments of the present disclosure, the width of the first positive pole signal line Van may be an average width of the first positive pole signal line Van in its extension direction (the first direction FS1), and the average width of the first positive pole signal line Van in the first direction FS1 refers to a value obtained by weighted summation of the width at each position of the first positive pole signal line Van. Similarly, the second positive pole signal line Vbn, the reference signal line Gn, the location signal transfer line Qn, and the drive signal line Dn all have the above characteristics.

Exemplarily, an average width L3 of the reference signal line Gn may be made to be greater than an average width L2 of the first positive pole signal line Van, or an average width L1 of the second positive pole signal line Vbn, or an average width L5 of the location signal transfer line Qn, or an average width L4 of the drive signal line Dn, which is not limited here.

In some embodiments of the present disclosure, the light-emitting devices may be, for example, a mini LED or a micro LED. Exemplarily, an orthographic projection of the light-emitting device on the base substrate may be quadrilateral, and a size of its long side or wide side may be between 80 m and 350 m. The light-emitting devices can be arranged on the base substrate through a surface mounting technology (SMT) or a mass transfer technology.

In some embodiments of the present disclosure, the drive control circuit 40 and the device groups are arranged in an active region of a first surface of the base substrate. The logic control circuit 30 may be an integrated circuit (IC), which is arranged in a peripheral region surrounding the active region of the base substrate or located on a second surface of the base substrate, wherein the first surface and the second surface are two opposite surfaces. The logic control circuit 30 is coupled with the signal lines on a display panel directly or through a flexible circuit board, so as to transmit the corresponding signal to the drive control circuit 40 or the device group through the coupled signal lines. An integrated pin of the IC may be used as an input end INP of the circuit component 10, and coupled with the system circuit 20, to receive the $i^{th}$ image signal Txi.

In some embodiments of the present disclosure, as shown in FIG. 1, the electronic device may include one display panel 100 and one logic control circuit 30. The system circuit 20 receives the initial signal Csi related to the display picture of the $i^{th}$ display frame from a television network interface and the like, generates the $i^{th}$ image signal Txi after performing a series of processing such as rendering and decoding on the initial signal Csi, and generates a frame refresh signal with the first frequency at the same time. When the set edge of a pulse of the frame refresh signal appears, the $i^{th}$ image signal Txi is output to the logic control circuit 30. The logic control circuit 30 receives the $i^{th}$ image signal Txi from the system circuit 20, obtains various types of drive control signals after further conversion and processing, and outputs the different types of corresponding drive control signals to the drive control circuit 40 or the device groups respectively through all the first positive pole signal lines Van, all the second positive pole signal lines Vbn, all the reference signal lines Gn, all the location signal transfer lines Qm and the drive signal line Dn in the display panel 100. Exemplarily, the first frequency may be any of 60 Hz, 90 Hz, 120 Hz, 180 Hz, and 240 Hz, which is not limited here.

Figure 9:
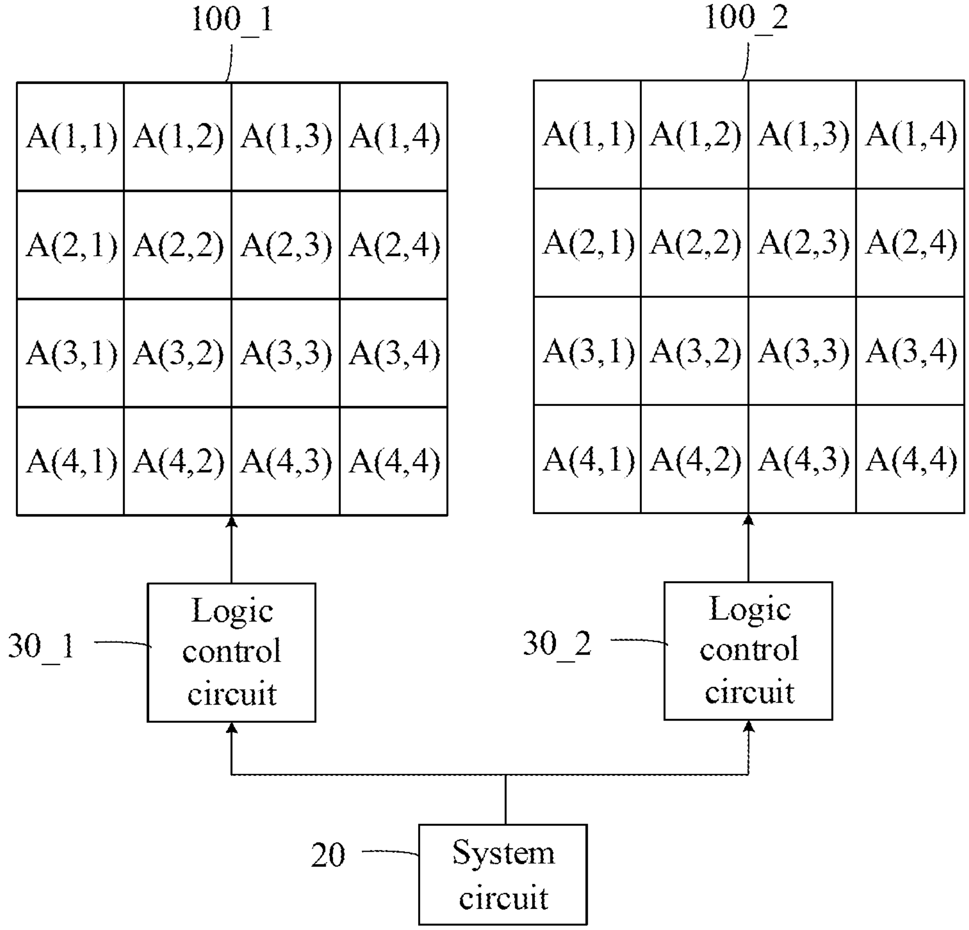
FIG. 9 illustrates some other schematic structural diagrams of an electronic device provided by an embodiment of the present disclosure.

Exemplarily, as shown in FIG. 9, the electronic device may include the plurality of display panels (such as 100_1, and 100_2) and the plurality of logic control circuits (such as 30_1, and 30_2). One display panel corresponds to one logic control circuit, and all the logic control circuits (such as 30_1 and 30_2) are coupled with one system circuit 20. In this way, a display panel with a larger size may be obtained by splicing the plurality of display panels.

Figure 10:
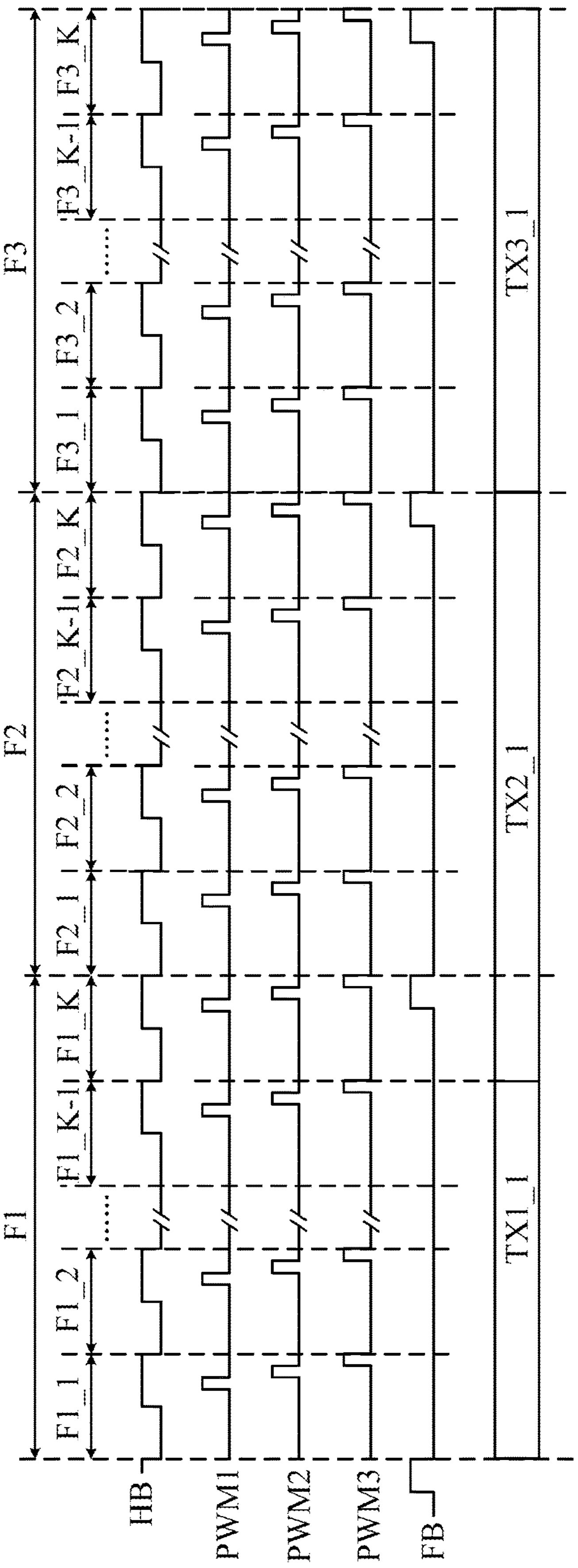
FIG. 10 illustrates some signal timing diagrams provided by an embodiment of the present disclosure.

In some embodiments of the present disclosure, when the set edge of the pulse of the frame refresh signal appears, the system circuit 20 may send the image signal corresponding to one display frame to the logic control circuit 30. Exemplarily, the set edge of the frame refresh signal may be a falling edge. Exemplarily, as shown in FIG. 10, FB represents the frame refresh signal. The frame refresh signal FB has the plurality of pulses. When the falling edge of each pulse appears, the image signal of the next display frame is sent to the logic control circuit 30. When the falling edge of each pulse appears, the system circuit 20 outputs the image signal corresponding to the display frame to the logic control circuit 30. For example, when a falling edge of a first pulse of the frame refresh signal FB appears, the logic control circuit 30 receives a first image signal corresponding to a display frame F1. When a falling edge of a second pulse of the frame refresh signal FB appears, the logic control circuit 30 receives a second image signal corresponding to a display frame F2. When a falling edge of a third pulse of the frame refresh signal FB appears, the logic control circuit 30 receives a third image signal corresponding to a display frame F3. When a falling edge of an $i^{th}$ pulse of the frame refresh signal FB appears, the logic control circuit 30 receives an $i^{th}$ image signal corresponding to a display frame Fi. The frequency of a frame synchronization signal is the first frequency. It should be noted that the set edge of the frame refresh signal may also be a rising edge. Its implementation may refer to the set edge of the frame refresh signal as the falling edge, which is not repeated here.

In some embodiments of the present disclosure, the logic control circuit 30 prestores an address of each drive control circuit 40 coupled with it. Moreover, in order to control each drive control circuit 40 coupled with the logic control circuit 30 to work synchronously as much as possible, the logic control circuit 30 may generate a horizontal synchronizing signal in each display frame, and output the corresponding drive control signal to the coupled drive control circuit 40 when the set edge of the pulse of the generated horizontal synchronizing signal appears. The frequency of the horizontal synchronizing signal is the second frequency. Exemplarily, in the display frame Fi, the quantity of the set edge of the horizontal synchronizing signal may be set according to the second frequency, so that the $i^{th}$ drive control signal may be sent to the drive control circuit 40 when the set edge of the pulse of the horizontal synchronizing signal appears.

Exemplarily, as shown in FIG. 10, the set edge of the horizontal synchronizing signal HB is the falling edge, and the set edge of the frame refresh signal FB is the falling edge. The system circuit 20 receives an initial signal related to the picture to be displayed in the display frame Fi. For example, the system circuit 20 receives the initial signal related to the picture to be displayed in the display frame F1, performs a series of processing such as rendering and decoding on the initial signal, and performs splitting according to a prestored address ID_1 corresponding to a logic control circuit 30_1 and an address ID_2 corresponding to a logic control circuit 30_2, so as to split first image signals (FIG. 10 takes a first image signal TX1_1 corresponding to the logic control circuit 301 as an example, and the first image signal corresponding to the logic control circuit 30_2 is not shown) respectively corresponding to the logic control circuit 30_1 and the logic control circuit 30_2. At the same time, the system circuit 20 generates the frame refresh signal FB. When the falling edge of the frame refresh signal FB appears, the first image signal (TX1_1) corresponding to the logic control circuit 30_1 is sent to the logic control circuit 30_1, and the first image signal corresponding to the logic control circuit 30_2 is sent to the logic control circuit 30_2. Taking the logic control circuit 30_1 as an example, after receiving the first image signal TX1_1, the logic control circuit 30_1 generates a first drive control signal corresponding to its coupled drive control circuit 40 according to the first image signal TX1_1, and generates the horizontal synchronizing signal HB. When the falling edge of the horizontal synchronizing signal HB appears (k is a positive integer, and 1≤k≤K), the logic control circuit 30_1 may output the first drive control signal to the drive control circuit 40 once. Each drive control circuit 40 may decode and perform secondary processing on the part of the first drive control signal corresponding to its corresponding address and then control the current flowing through all of its output pins.

A working process of the logic control circuit 302 may refer to a working process of the logic control circuit 30_1, which is not specifically repeated here. It should be noted that the set edge of the horizontal synchronizing signal may also be set as the rising edge. Its implementation may refer to the implementation when the set edge of the horizontal synchronizing signal is the falling edge, which is not repeated here.

In some embodiments of the present disclosure, any drive control circuit 40 may control the positive pole signal line and its reference signal pin O6 to form an electrical circuit within a working time period of one display subframe. Since the positive pole signal line is coupled with the first end of the light-emitting device in the device group, the reference signal pin O6 of the drive control circuit 40 is coupled with the second end of the light-emitting device in the device group. When the positive signal line sequentially forms the electrical circuit through the coupled device group, the output pins (such as O1-O3) of the drive control circuit 40, and the reference signal pin O6, the light-emitting device may be controlled to emit light under the control of current signals with different current amplitudes and/or different duty ratios. Exemplarily, the working time period is a time phase for forming the above electrical circuit. For example, the positive pole signal line includes the first positive pole signal line and the second positive pole signal line. Any drive control circuit 40 may control the first positive pole signal line to form an electrical circuit within the working time period of each display subframe sequentially through the coupled first-color light-emitting device 1111, the output pin O1 of the drive control circuit 40, and the reference signal pin O6, so as to make the first-color light-emitting device 1111 to emit the light. The second positive pole signal line is controlled to form the electrical circuit within the working time period of each display subframe sequentially through the coupled second-color light-emitting device 1112, the output pin O2 of the drive control circuit 40, and the reference signal pin O6, so as to make the second-color light-emitting device 1112 to emit the light. The second positive pole signal line is controlled to form the electrical circuit within the working time period of each display subframe sequentially through the coupled third-color light-emitting device 1113, the output pin O3 of the drive control circuit 40, and the reference signal pin O6, so as to make the third-color light-emitting device 1113 to emit the light.

In some embodiments of the present disclosure, the working process of the circuit component 10 may include an address allocation phase t1 and a data signal transmission phase t3. Illustration is made by taking the logic control circuit 30_1 of the electronic device and the display panel 110_1 as an example in combination with a signal timing diagram shown in FIG. 11 and FIG. 12.

Figure 12:
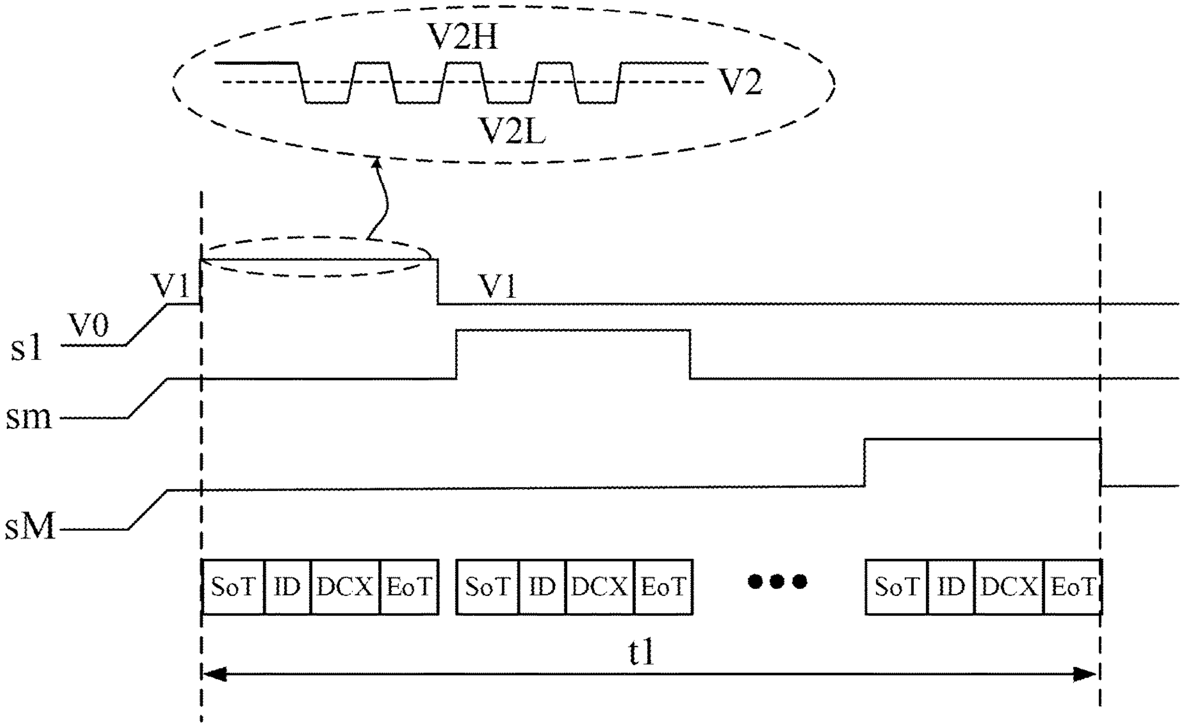
FIG. 12 illustrates some another signal timing diagrams provided by an embodiment of the present disclosure.

At the address allocation phase t1, the logic control circuit 301 may sequentially input location information sm (m is a positive integer, and 1≤m≤M) to each location signal line Sm. The drive control circuit 40 may receive the corresponding location information sm. FIG. 12 is a schematic timing diagram of the location information in the embodiment of the present disclosure. For example, the logic control circuit 30_1 transmits location information s1 including an address ID of 00000001 to the location signal line S1, and the plurality of drive control circuits 40 arranged in the first direction FS1 and connected with the location signal line S1 receive the location information s1. The logic control circuit 30_1 transmits location information s2 including an address ID of 00000010 to the location signal line S2, and the plurality of drive control circuits 40 arranged in the first direction FS1 and connected with the location signal line S2 receive the location information s2. The rest is the same. The address allocation process to the drive control circuit 40 in each functional unit may be completed in the same way.

At the data signal transmission phase t3, that is, when the first falling edge of the horizontal synchronizing signal HB appears, the logic control circuit 30_1 may provide the drive control signal da with the address of each drive control circuit 40 coupled thereto to each drive signal line Dn respectively. The drive control circuit 40 may receive the drive control signal when recognizing the corresponding address in the drive control signal, and generate a light-emitting control signal according to the drive control signal to control the positive pole signal line to form the electrical circuit sequentially via the device group coupled with the drive control circuit 40, one signal channel end ONP (the output pin of the drive control circuit 40) of the circuit component 10, and the reference signal pin O6. Exemplarily, each drive control signal da may include a plurality of sub-data information dam (m is a positive integer, and 1≤m≤M) arranged sequentially according to a specific order (for example, the specific order may be ordering sequentially of the physical position of the drive control circuit 40), so that the plurality of sub-data information dam may be sequentially input to each drive signal line Dn, and thus the drive signal line Dn sequentially transmits the corresponding sub-data information dam to each drive control circuit 40 in the corresponding functional unit column. The sub-data information may include: an address ID corresponding to each functional unit (that is, the address ID corresponding to the drive control circuit 40 in the functional unit), and pixel data information of the functional unit corresponding to the address ID and coupled with the drive signal line Dn. When recognizing that the address ID in the sub-data information dam is the same as the address ID received at the address allocation stage t1, the drive control circuit 40 receives the sub-data information dam, and generates the light-emitting control signal corresponding to each signal channel end ONP (the output pin of the drive control circuit 40) according to the drive control signal, so as to control the coupled positive pole signal line (such as the first positive pole signal line and/or the second positive pole signal line) to form the electrical circuit sequentially via the device group coupled with the drive control circuit 40, the signal channel end ONP (the output pin of the drive control circuit 40), and the reference signal pin O6.

In some examples, a structure of the display panel shown in FIG. 4, the logic control circuit 301 and the display panel 100_1 are taken as an example. At the data signal transmission phase t3, the logic control circuit 30_1 inputs the drive control signal including the sub-data information da1-daM to the drive signal line Dn, and the drive control circuit 40 coupled with the drive signal line Dn respectively obtains the sub-data information matched with its address ID from the drive control signal including the sub-data information da1-daM. The drive control circuit 40 may generate a light-emitting control signal EM1 corresponding to the first-color light-emitting device 1111 coupled with the output pin O1, a light-emitting control signal EM2 corresponding to the second-color light-emitting device 1112 coupled with the output pin O2, and a light-emitting control signal EM3 corresponding to the third-color light-emitting device 1113 coupled with the output pin O3 according to the sub-data information. Under the control of the light-emitting control signal EM1, the at least one positive pole signal line may form the electrical circuit sequentially via the first-color light-emitting device 1111, the output pin O1 of the drive control circuit 40, and the reference signal pin O6 in order to make the first-color light-emitting device 1111 to emit the light. Under the control of the light-emitting control signal EM2, the at least one positive pole signal line may form the electrical circuit sequentially via the second-color light-emitting device 1112, the output pin O2 of the drive control circuit 40, and the reference signal pin O6 in order to make the second-color light-emitting device 1112 to emit the light. Under the control of the light-emitting control signal EM3, the at least one positive pole signal line may form the electrical circuit sequentially via the third-color light-emitting device 1113, the output pin O3 of the drive control circuit 40, and the reference signal pin O6 in order to make the third-color light-emitting device 1113 to emit the light.

It should be noted that each drive control signal da includes a set of the sub-data information corresponding to the M drive control circuits 40 arranged in the second direction FS2, and the sub-data information includes drive information of the device group connected with each of the M drive control circuits 40.

Exemplarily, as shown in FIG. 12, the location information sm may include: a start instruction SoT, an address ID, an interval instruction DCX and an end instruction EoT set in sequence. In practical applications, the addresses ID in the location information sm corresponding to each location signal line Sm are different, and thus the addresses of the drive control circuit 40 in different rows are distinguished. Exemplarily, a length of the location information sm may be set to be 12 bits, where the start instruction SoT may be set to be 1 bit, the address ID may be set to be 8 bits, the interval instruction DCX may be set to be 1 bit, and the end instruction EoT may be set to be 2 bits.

In some embodiments of the present disclosure, the logic control circuit 30 may further input a power supply voltage to the location signal line Sm, and the drive control circuit 40 may receive the power supply voltage transmitted by the location signal line Sm through the addressing pin O5. Exemplarily, as shown in FIG. 12, a location function (such as transmitting of the location information) and other functions (such as transmitting of the power supply voltage VCC) may be distinguished by distinguishing a signal amplitude transmitted by the location signal line Sm. For example, the location function is executed during a signal amplitude level V2 (for example, a voltage value is 3.3 V), and a display function (such as the transmitting of the power supply voltage VCC) is executed during a signal amplitude level V1 (for example, the voltage value is 1.8 V). In actual work, first, the signal amplitude transmitted by the location signal line Sm needs to be raised from a level V0 (such as 0 V) to the level V1 to make components connected with the location signal line Sm enter into a working state. Then, after the signal amplitude changes from the level V1 to fluctuate based on the level V2, the location signal line Sm executes the location function, and transmits a fluctuation rule of the signal by modulating the location signal line Sm. For example, the signal changes between the first amplitude V2H and the second amplitude V2L, and V1<V2L<V2<V2H, by modulating the change rule of the first amplitude V1 and the second amplitude V2, the location information sm may be modulated into the signal, so that the corresponding address is transmitted while electric energy is transmitted. For example, the location information sm starts with the start instruction SoT, then transmits the address ID and the interval instruction DCX, and finally ends the address allocation of the pixel row with the end instruction EoT. When the signal amplitude fluctuates based on the level V2 back to the level V1 and remains at the level V1, the location signal line Sm may be used to transmit the power supply voltage. In other words, the level V1 transmitted by the location signal line Sm may be used as the power supply voltage.

Figure 11:
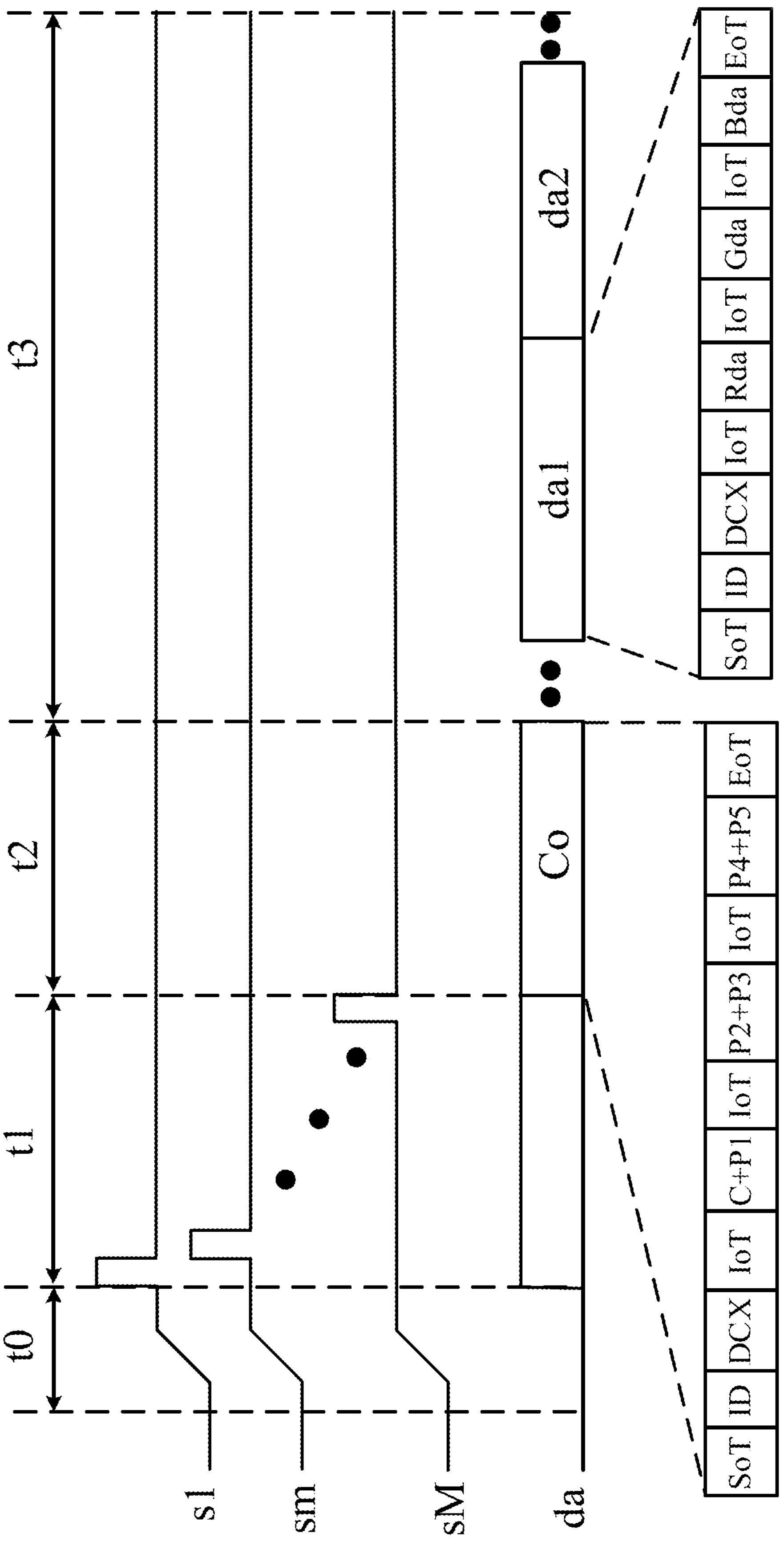
FIG. 11 illustrates some other signal timing diagrams provided by an embodiment of the present disclosure.

In some embodiments of the present disclosure, taking a structure shown in FIG. 4 as an example, as shown in FIG. 4 and FIG. 11, the above sub-data information (taking da1 as an example) may include: a start instruction SoT, an address ID, a data transmission instruction DCX, an interval instruction IoT, pixel data information Rda, Gda, Bda, and an end instruction EoT. When the data transmission command DCX is a set value, it represents performing of data transmission. For example, when DCX=1, it represents data transmission. When the drive control circuit 40 recognizes that the value of DCX is 1, the pixel data information in the sub-data information is transmitted to the corresponding light-emitting diode. Moreover, the pixel data information Rda represents the information required by driving the first-color light-emitting device 1111 to emit the light, the pixel data information Gda represents the information required by driving the second-color light-emitting device 1112 to emit the light, and the pixel data information Bda represents the information required by driving the third-color light-emitting device 1113 to emit the light. Exemplarily, the length of each sub-data information may be set to be 63 bits. Taking the sub-data information da1 as an example, the length of the sub-data information da1 may be set to be 63 bits, wherein the start instruction SoT accounts for 1 bit, the address ID accounts for 8 bits, the data transmission instruction DCX accounts for 1 bit, the interval instruction IoT accounts for 1 bit, the pixel data information Rda, Gda or Bda accounts for 16 bits respectively, and the end instruction EoT accounts for 2 bits. In addition, the interval instruction IoT may also be set between the adjacent pixel data information.

It may be understood that before the t1 phase, the drive control circuit 40 of the present disclosure may be in a sleep state, and the sleep state is a low-power-consumption working mode or a non-working state. The power supply voltage VCC is input to the addressing pin O5 of the drive control circuit 40 through the location signal line Sm, so that the drive control circuit 40 is released from the sleep state, namely, the t0 phase in FIG. 11.

In some other examples, the structure of the display panel shown in FIG. 6, the logic control circuit 30_1 and the display panel 100_1 are taken as an example. In combination with FIG. 13, at the data signal transmission phase t3, the logic control circuit 30_1 sequentially inputs the sub-data information da1-daM to the drive signal line Dn, and the drive control circuit 40 coupled with the drive signal line Dn respectively obtains the sub-data information matched with its address ID from the drive control signal including the sub-data information da1-daM.

The drive control circuit 40 may generate the light-emitting control signal EM1_1 corresponding to the first-color light-emitting device 1111 coupled with the output pin O11, the light-emitting control signal EM1_2 corresponding to the first-color light-emitting device 1111 coupled with the output pin O1_2, the light-emitting control signal EM1_3 corresponding to the first-color light-emitting device 1111 coupled with the output pin O13, the light-emitting control signal EM1_4 corresponding to the first-color light-emitting device 1111 coupled with the output pin O1_4, the light-emitting control signal EM2_1 corresponding to the second-color light-emitting device 1112 coupled with the output pin O21, the light-emitting control signal EM2_2 corresponding to the second-color light-emitting device 1112 coupled with the output pin O2_2, the light-emitting control signal EM2_3 corresponding to the second-color light-emitting device 1112 coupled with the output pin O23, the light-emitting control signal EM2_4 corresponding to the second-color light-emitting device 1112 coupled with the output pin O2_4, the light-emitting control signal EM3_1 corresponding to the third-color light-emitting device 1113 coupled with the output pin O31, the light-emitting control signal EM3_2 corresponding to the third-color light-emitting device 1113 coupled with the output pin O3_2, the light-emitting control signal EM3_3 corresponding to the third-color light-emitting device 1113 coupled with the output pin O33, and the light-emitting control signal EM3_4 corresponding to the third-color light-emitting device 1113 coupled with the output pin O3_4 according to the sub-data information. Under the control of the light-emitting control signals EM1_1-EM1_4, the at least one positive pole signal line may form the electrical circuit sequentially via the first-color light-emitting device 1111, the output pin O1 (including any one of O1_1-O1_4) of the drive control circuit 40, and the reference signal pin O6 in order to make the corresponding first-color light-emitting device 1111 to emit the light. Under the control of the light-emitting control signals EM2_1-EM2_4, the at least one positive pole signal line may form the electrical circuit sequentially via the second-color light-emitting device 1112, the output pin O2 (including any one of O2_1-O2_4) of the drive control circuit 40, and the reference signal pin O6 in order to make the corresponding second-color light-emitting device 1112 to emit the light. Under the control of the light-emitting control signals EM3_1-EM3_4, the at least one positive pole signal line may form the electrical circuit sequentially via the third-color light-emitting device 1113, the output pin O3 (including any one of O3_1-O3_4) of the drive control circuit 40, and the reference signal pin O6 in order to make the corresponding third-color light-emitting device 1113 to emit the light.

It should be noted that the working process of the display panel shown in FIG. 6 at the address allocation phase t1 and the t0 phase may be basically the same as the working process of the display panel shown in FIG. 4 at the address allocation phase t1 and the phase to, which is not repeated here.

Figure 13:
FIG. 13 illustrates some another signal timing diagrams provided by an embodiment of the present disclosure.

In some embodiments of the present disclosure, when the plurality of device groups are included in the functional unit, in combination with FIG. 6 and FIG. 13, the sub-data information (taking da1 as an example) may include: the start instruction SoT, the address ID, the data transmission instruction DCX, the interval instruction IoT, pixel data information Rda1-Rda4, Gda1-Gda4, Bda1-Bda4, and the end instruction EoT. When the data transmission instruction DCX is the set value, it represents performing of data transmission. For example, when DCX=1, it represents data transmission. When the drive control circuit 40 recognizes that the value of DCX is 1, the pixel data information in the sub-data information is transmitted to the corresponding light-emitting diode. Moreover, the pixel data information Rda1-Rda4 represents the information required by driving the four first-color light-emitting devices 1111 coupled with the drive control circuit 40 to emit the light, the pixel data information Gda1-Gda4 represents the information required by driving the four second-color light-emitting devices 1112 coupled with the drive control circuit 40 to emit the light, and the pixel data information Bda1-Bda4 represents the information required by driving the four third-color light-emitting devices 1113 coupled with the drive control circuit 40 to emit the light. Exemplarily, the length of each sub-data information may be set to be 63 bits. Taking the sub-data information da1 as an example, the start instruction SoT accounts for 1 bit, the address ID accounts for 8 bits, the data transmission instruction DCX accounts for 1 bit, the interval instruction IoT accounts for 1 bit, the pixel data information Rda1, Rda2, Rda3 and Rda4 totally accounts for 16 bits, the sub-pixel data Gda1, Gda2, Gda3 and Gda4 totally accounts for 16 bits, the sub-pixel data Bda1, Bda2, Bda3 and Bda4 totally accounts for 16 bits, and the end instruction EoT accounts for 2 bits. In addition, the interval instruction IoT may be set between any two adjacent sub-data information. It may be understood that since one drive control circuit 40 drives the twelve light-emitting devices, a serial number relationship between the four pixels 1 connected with the drive control circuit 40 may be realized through a digital logic circuit inside the drive control circuit 40, so as to accurately distribute the sub-pixel data corresponding to all the light-emitting devices in the pixel data information to the corresponding signal channel end ONP.

In some embodiments of the present disclosure, each display frame may further include: a current setting phase t2 before the data signal transmission phase t3. For example, the current setting phase t2 may be located between the address allocation phase t1 and the data signal transmission phase t3. At the current setting phase t2, the logic control circuit 301 inputs current setting information Co with the address ID to each drive signal line Dn. The drive control circuit 40 may receive the current setting information Co when recognizing the corresponding address in the current setting information Co, so as to control the size of a drive current of the drive control circuit 40 according to the received current setting information Co, and thus further accurately control the light-emission brightness of the corresponding functional unit. Exemplarily, in combination with FIG. 9 and FIG. 11, at the current setting phase t2, the logic control circuit 30_1 inputs the current setting information Co to each drive signal line Dn. The address ID may be set in the current setting information Co. The drive control circuit 40 receives the current setting information corresponding to its address from the current setting information Co transmitted on the drive signal line Dn.

Optionally, the length of the current setting information Co may be 63 bits, which may specifically include: 1 bit of the start instruction SoT, 8 bits of the address ID, 1 bit of the current setting instruction DCX, 1 bit of interval instruction IoT, 16 bits of data composed of a frame start instruction C and a control instruction P1 (for example, it represents that a current amplitude correction coefficient of the light-emitting diode coupled with the certain signal channel end ONP needs to be provided), 1 bit of the interval instruction IoT, 16 bits of reserved control instruction bits P2+P3, 1 bit of the interval instruction IoT, 16 bits of reserved control instruction bits P4+P5 and 2 bits of the end instruction EoT. When the current setting instruction DCX is the set value, it represents performing of current setting. For example, when DCX is 0, it represents performing of current setting.

It may be understood that in a process of displaying pictures one display frame by one display frame, the display panel may not display the picture at the first display frame entered after the electronic device is turned on (for example, displaying all black), but perform the process of the t0 phase and the t1 phase in the first display frame, and the electronic device may only execute the t2 phase and the t3 phase in the second and subsequent display frames. In this way, each display subframe in each display frame may have the process of the t2 phase and the t3 phase respectively. Alternatively, the processes of the t0 phase, the t1 phase and the t2 phase may be performed in the first display frame, and the electronic device may only execute the process of the t3 phase in the second and subsequent display frames. In this way, each display subframe in each display frame may have the process of the t3 phase respectively. That is to say, in the signal timing diagram shown in FIG. 10, before the display frame F1, there may further be a display frame F0, and the process of the t0 phase and the t1 phase or the process from the t0 phase to the t2 phase may be executed in the display frame F0. Each display subframe in the display frames F1-F3 executes the process of the t3 phase respectively.

Figure 14:
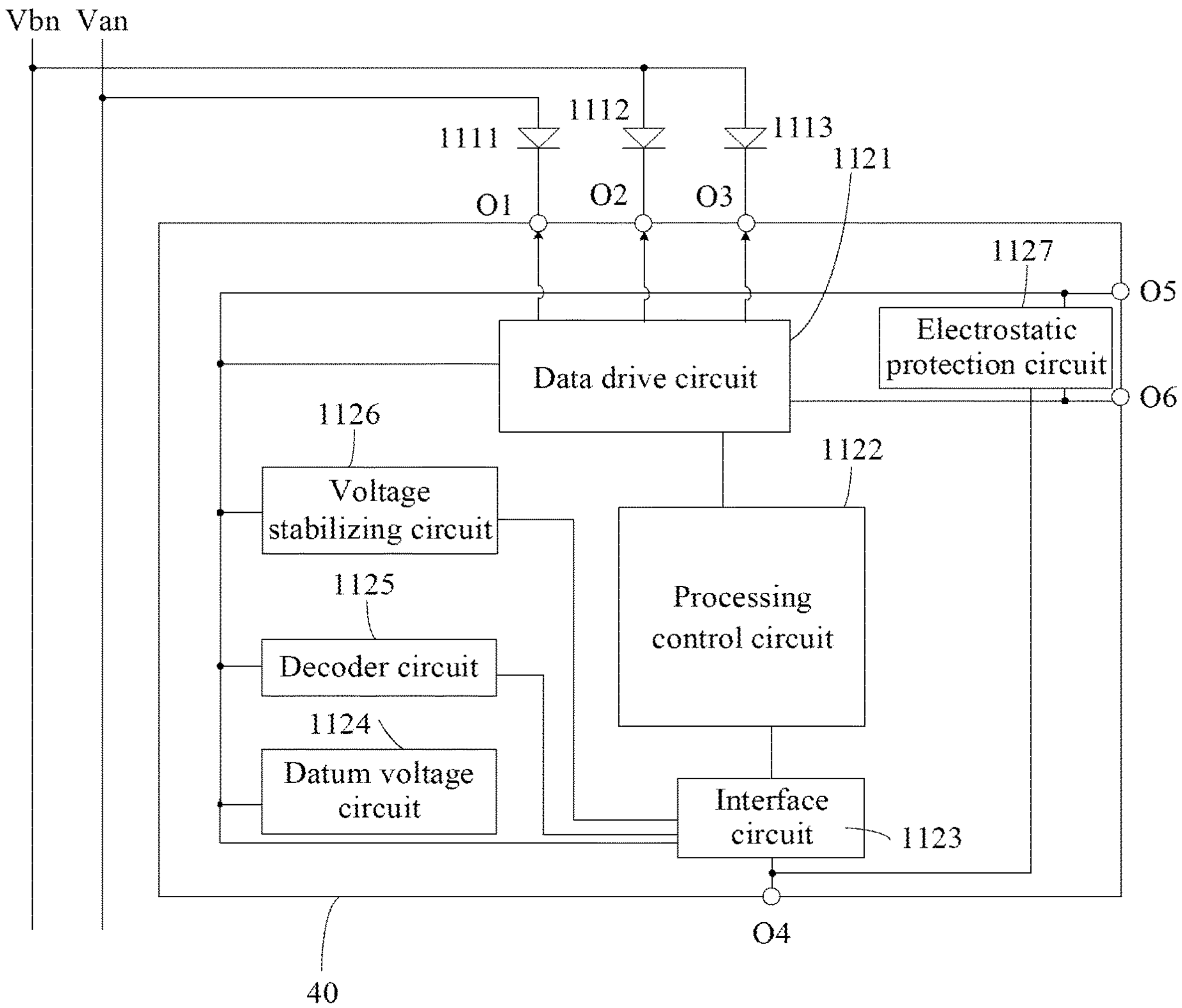
FIG. 14 illustrates some schematic structural diagrams of a drive control circuit provided by an embodiment of the present disclosure.

In some embodiments of the present disclosure, as shown in FIG. 14, any drive control circuit 40 may include: a processing control circuit 1122 and a data drive circuit 1121. The processing control circuit 1122 is coupled with the input pin O4 and the addressing pin O5 respectively, and the data drive circuit 1121 is coupled with the processing control circuit 1122, the signal channel end ONP of the drive control circuit 40, the addressing pin O5 and the reference signal pin O6 respectively. Moreover, the data drive circuit 1121 is coupled with the second end of the light-emitting device in the corresponding device group through the signal channel end ONP. The processing control circuit 1122 may receive the drive control signal through the input pin O4 in the display subframe when recognizing the corresponding address in the drive control signal, generate the light-emitting control signal according to the drive control signal, and send the light-emitting control signal to the data drive circuit 1121. Moreover, the data drive circuit 1121 may control the positive pole signal line (such as the first positive pole signal line and the second pole positive signal line) to form the electrical circuit sequentially via the light-emitting device in the device group coupled with the drive control circuit 40, the signal channel end ONP of the drive control circuit 40, and the reference signal pin O6 according to the received light-emitting control signal in the display subframe, so as to control each light-emitting device to emit the light through the formed electrical circuit.

Figure 15:
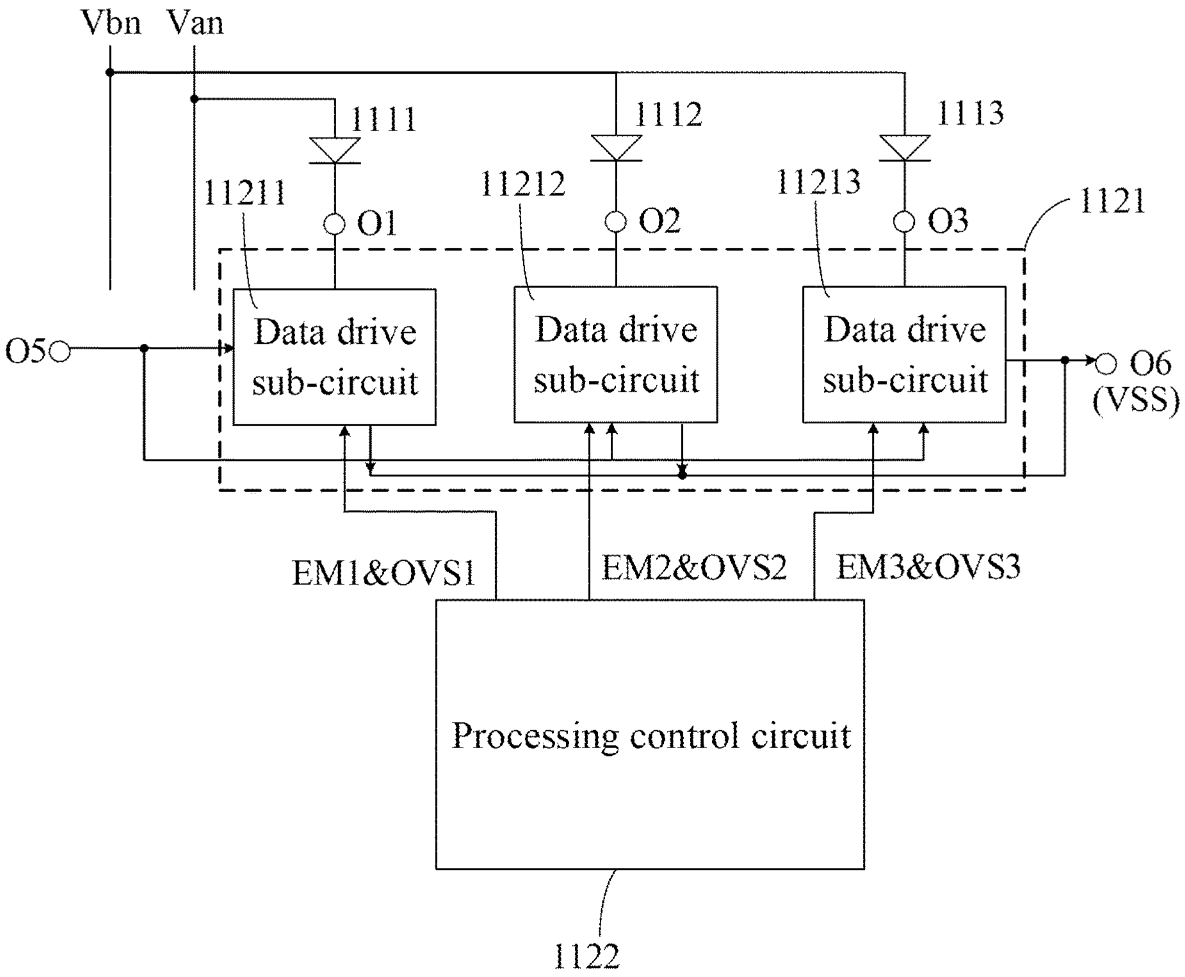
FIG. 15 illustrates some schematic local structural diagrams of a drive control circuit provided by an embodiment of the present disclosure.

In some embodiments of the present disclosure, as shown in FIG. 14 and FIG. 15, the data drive circuit 1121 may include at least one data drive sub-circuit (such as 11211, 11212 and 11213). The data drive sub-circuits (such as 11211, 11212 and 11213) are respectively coupled with the processing control circuit 1122, the addressing pin O5 and the reference signal pin O6, and one data drive sub-circuit is coupled with one signal channel end ONP, that is, one data drive sub-circuit may be coupled with the negative pole of the light-emitting device in one sub-pixel through the corresponding signal channel end ONP. When the power supply voltage VCC is input through the addressing pin O5, the power supply voltage VCC may be provided to the data drive sub-circuit to supply power to the data drive sub-circuit. When the reference voltage VSS is input through the reference signal pin O6, the reference voltage VSS may be provided to the data drive sub-circuit to provide a low voltage for the data drive sub-circuit. The data drive sub-circuits (such as 11211, 11212 and 11213) may receive the light-emitting control signal corresponding to the coupled device group in the display subframe, and control the positive pole signal line to form the electrical circuit sequentially via the device group coupled with the drive control circuit 40, the output pin of the drive control circuit 40, and the reference signal pin O6 in response to the light-emitting control signal. Exemplarily, in combination with FIG. 4, FIG. 14 and FIG. 15, the data drive sub-circuit 11211 is coupled with the output pin O1, the output pin O1 is coupled with the negative pole of the first-color light-emitting device 1111, and the positive pole of the first-color light-emitting device 1111 is coupled with the first positive pole signal line. The data drive sub-circuit 11211 may receive the light-emitting control signal EM1 of the corresponding first-color light-emitting device 1111 to respond to the light-emitting control signal EM1, and may drive the first positive pole signal line Van, the first-color light-emitting device 1111, the output pin O1 and the reference signal pin O6 to form the electrical circuit, so that the first-color light-emitting device 1111 may emit the light due to flowing of the current. Moreover, the data drive sub-circuit 11212 is coupled with the output pin O2, the output pin O2 is coupled with the negative pole of the second-color light-emitting device 1112, and the positive pole of the second-color light-emitting device 1112 is coupled with the second positive pole signal line Vbn. The data drive sub-circuit 11212 may receive the light-emitting control signal EM2 of the corresponding second-color light-emitting device 1112 to respond to the light-emitting control signal EM2, and may drive the second positive pole signal line Vbn, the second-color light-emitting device 1112, the output pin O2 and the reference signal pin O6 to form the electrical circuit, so that the second-color light-emitting device 1112 may emit the light due to flowing of the current. The data drive sub-circuit 11213 is coupled with the output pin O3, the output pin O3 is coupled with the negative pole of the third-color light-emitting device 1113, and the positive pole of the third-color light-emitting device 1113 is coupled with the second positive pole signal line Vbn. The data drive sub-circuit 11213 may receive the light-emitting control signal EM3 of the corresponding third-color light-emitting device 1113 to respond to the light-emitting control signal EM3, and may drive the second positive pole signal line Vbn, the third-color light-emitting device 1113, the output pin O3 and the reference signal pin O6 to form the electrical circuit, so that the third-color light-emitting device 1113 may emit the light due to flowing of the current.

In some embodiments of the present disclosure, the light-emitting control signal may include a switch control signal and a current control signal. Each data drive sub-circuit may include: a modulation circuit and a constant-current source circuit. The constant-current source circuit is coupled with the processing control circuit 1122 and the modulation circuit respectively, and the modulation circuit is coupled with the corresponding signal channel end ONP. The constant-current source circuit may receive the current control signal of the corresponding device group, and output the constant-amplitude current corresponding to the current control signal according to the received current control signal. The modulation circuit may receive the switch control signal of the corresponding device group, and input the current generated by a constant-current source into the coupled signal channel end ONP according to an effective level of the received switch control signal, so as to control the positive pole signal line to form the electrical circuit at least sequentially via the device group coupled with the drive control circuit 40, the signal channel end ONP of the drive control circuit 40, and the reference signal pin within a working time period.

Figure 16:
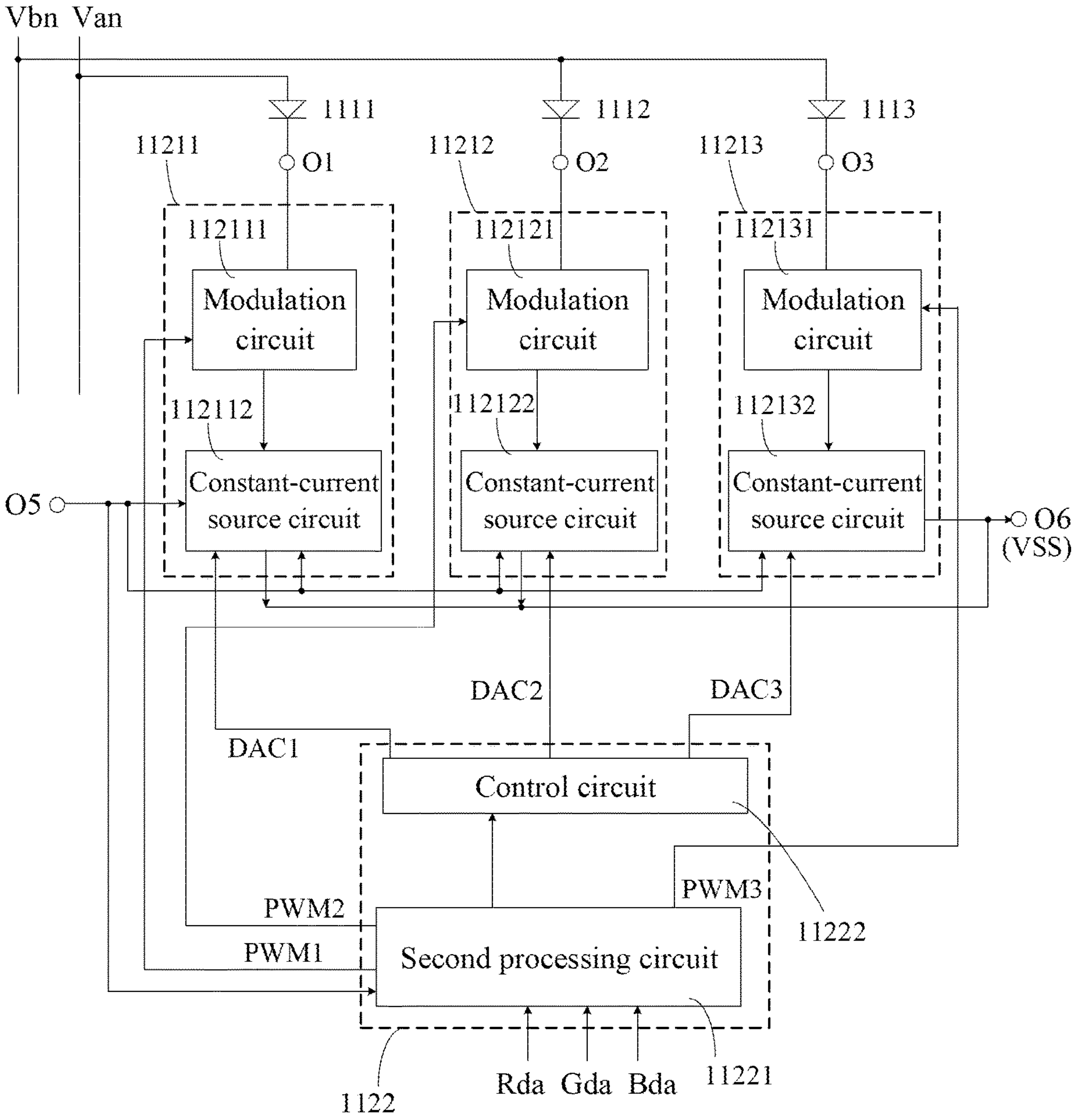
FIG. 16 illustrates some other schematic local structural diagrams of a drive control circuit provided by an embodiment of the present disclosure.

Exemplarily, as shown in FIG. 10, FIG. 15 and FIG. 16, the light-emitting control signal EM1 may include the switch control signal PWM1 and the current control signal DAC1, and the data drive sub-circuit 11211 includes: the modulation circuit 112111 and the constant-current source circuit 112112. The constant-current source circuit 112112 may receive the current control signal DAC1 corresponding to the first-color light-emitting device 1111, and output the constant-amplitude current IL1 corresponding to the current control signal DAC1 according to the received current control signal DAC1. The modulation circuit 112111 may receive the switch control signal PWM1 corresponding to the first-color light-emitting device 1111, and input the current IL1 generated by the constant-current source circuit 112112 into the coupled output pin O1 according to the effective level (such as a high level) of the received switch control signal PWM1, so as to control the first positive pole signal line Van to form the electrical circuit at least sequentially via the first-color light-emitting device 1111, the output pin O1 of the drive control circuit 40, and the reference signal pin O6 within the working time period, thereby making the first-color light-emitting device 1111 to emit the light. That is to say, within the duration of the effective level of the switch control signal PWM1, the first-color light-emitting device 1111 may be regarded to be in the working time period. In this way, the switch control signal PWM1 and the current control signal DAC1 may be combined with each other to control the light-emitting brightness of the first-color light-emitting device 1111 in each display subframe in each display frame.

Moreover, the light-emitting control signal EM2 may include the switch control signal PWM2 and the current control signal DAC2, and the data drive sub-circuit 11212 includes: the modulation circuit 112121 and the constant-current source circuit 112122. The constant-current source circuit 112122 may receive the current control signal DAC2 corresponding to the second-color light-emitting device 1112, and output the constant-amplitude current IL2 corresponding to the current control signal DAC2 according to the received current control signal DAC2. The modulation circuit 112121 may receive the switch control signal PWM2 corresponding to the second-color light-emitting device 1112, and input the current IL2 generated by the constant-current source circuit 112122 into the coupled output pin O2 according to the effective level (such as the high level) of the received switch control signal PWM2, so as to control the second positive pole signal line Vbn to form the electrical circuit at least sequentially via the second-color light-emitting device 1112, the output pin O2 of the drive control circuit 40, and the reference signal pin O6 within the working time period, thereby making the second-color light-emitting device 1112 to emit the light. That is to say, within the duration of the effective level of the switch control signal PWM2, the second-color light-emitting device 1112 may be regarded to be in the working time period. In this way, the switch control signal PWM2 and the current control signal DAC2 may be combined with each other to control the light-emitting brightness of the second-color light-emitting device 1112 in each display subframe in each display frame.

Moreover, the light-emitting control signal EM3 may include the switch control signal PWM3 and the current control signal DAC3, and the data drive sub-circuit 11213 includes: the modulation circuit 112131 and the constant-current source circuit 112132. The constant-current source circuit 112132 may receive the current control signal DAC3 corresponding to the third-color light-emitting device 1113, and output the constant-amplitude current IL3 corresponding to the current control signal DAC3 according to the received current control signal DAC3. The modulation circuit 112131 may receive the switch control signal PWM3 corresponding to the third-color light-emitting device 1113, and input the current IL3 generated by the constant-current source circuit 112132 into the coupled output pin O3 according to the effective level (such as the high level) of the received switch control signal PWM3, so as to control the second positive pole signal line Vbn to form the electrical circuit at least sequentially via the third-color light-emitting device 1113, the output pin O3 of the drive control circuit 40, and the reference signal pin O6 within the working time period, thereby making the third-color light-emitting device 1113 to emit the light. That is to say, within the duration of the effective level of the switch control signal PWM3, the third-color light-emitting device 1113 may be regarded to be in the working time period. In this way, the switch control signal PWM3 and the current control signal DAC3 may be combined with each other to control the light-emitting brightness of the third-color light-emitting device 1113 in each display subframe in each display frame.

It should be noted that the effective level of the switch control signal may also be a low level, which is not limited here.

To sum up, when the modulation circuit is on, the above electrical circuit is on, and the corresponding device emits the light. When the modulation circuit is cut off, the above electrical circuit is disconnected, and the corresponding device does not emit the light. Therefore, the modulation circuit may modulate the current flowing through the device under the control of the switch control signal PWM, so that the current flowing through the device is presented as a current signal that can be modulated by a pulse width. Therefore, the switch control signal PWM may serve as a pulse width modulation signal. Moreover, the modulation circuit may modulate the current flowing through the device according to a duty cycle of the switch control signal PWM and other parameters, and then control the working state of the device group. For example, when the device is the light-emitting device, by increasing the duty cycle of the switch control signal PWM, the total light-emitting duration of the light-emitting device in one display frame (or the display subframe) may be increased, and then the total light-emitting brightness of the light-emitting device in the display frame (or the display subframe) may be improved, so as to increase the brightness of the light-emitting device. On the contrary, by decreasing the duty cycle of the switch control signal PWM, the total light-emitting duration of the light-emitting device in one display frame (or the display subframe) may be reduced, and then the total light-emitting brightness of the light-emitting device in the display frame (or the display subframe) may be reduced, so as to reduce the brightness of the light-emitting device.

Exemplarily, the modulation circuit may be a switch element, such as a metal-oxide-semiconductor field-effect transistor (MOSFET), a thin film transistor (TFT), and other transistors. Of course, in practical applications, the specific implementation of the modulation circuit may be determined according to the needs of the practical applications, which is not limited here.

Exemplarily, the constant-current source circuit may be implemented in many ways. For example, the constant-current source circuit may be set as a circuit composed of a constant-current diode, a digital analog converter and a trigger combination, a current mirror current, and so on. Of course, in practical applications, the specific implementation of the constant-current source circuit may be determined according to the needs of the practical applications, which is not limited here.

In some examples, taking the 16 bits of pixel data information Rda corresponding to the first-color light-emitting device 1111 as an example, the 16 bits of pixel data information corresponding to other light-emitting devices adopts the same data type and coding rule. Exemplarily, if the pixel data information Rda is 16 bits, it may have but is not limited to the following implementations: the current control signal DAC1 occupies 6 bits and the switch control signal PWM1 occupies 10 bits; or the current control signal DAC1 occupies 5 bits and the switch control signal PWM1 occupies 11 bits; or the current control signal DAC1 occupies 4 bits and the switch control signal PWM1 occupies 12 bits; or the current control signal DAC1 occupies 3 bits and the switch control signal PWM1 occupies 13 bits.

Taking an example that the current control signal DAC1 occupies 6 bits and the switch control signal PWM1 occupies 10 bits, the current control signal DAC1 may control the constant-current source circuit 112112 to output 64 ($2^6$) different current amplitudes. The constant-current source circuit 112112 may have different current gears, such as 2 uA, 3 uA, and 5 uA. Taking the current gear of 2 uA as an example, a maximum value of the current IL1 capable of being output by the constant-current source circuit 112112 is 128 uA (2 uA*64), and a minimum value is 2 uA (2 uA*1), so that the current IL1 amplitude has a total of 64 optional values, which can further meet the different brightness requirements of the first-color light-emitting device 1111. If the switch control signal PWM1 occupies 10 bits, the duty cycle of the switch control signal PWM1 may have 1024 ($2^{10}$) different situations. The more bits occupied by the switch control signal PWM1, the more types of the situations of the duty cycle of the switch control signal PWM1, and the smaller the minimum time length of the effective level it can achieve, that is, the higher the control precision of the working time period.

In some embodiments of the present disclosure, as shown in FIG. 14-FIG. 16, the processing control circuit 1122 may include: a second processing circuit 11221 and a control circuit 11222. The second processing circuit 11221 may generate the switch control signal corresponding to each device group coupled to it according to the received pixel data information Rda, Gda and Bda and send it to the data drive sub-circuit corresponding to each device group. The second processing circuit 11221 may further generate current amplitude control information corresponding to each device group coupled with it according to the received pixel data information and provide it to the control circuit 11222. The control circuit 11222 may generate the current control signal in the light-emitting control signal corresponding to each device group according to the received current amplitude control information corresponding to each device group, and send the generated current control signal corresponding to each device group to the data drive sub-circuit corresponding to each device group.

Exemplarily, as shown in FIG. 4 and FIG. 14 to FIG. 16, the second processing circuit 11221 may generate the switch control signal PWM1 and current amplitude control information corresponding to the first-color light-emitting device 1111 according to the received pixel data information Rda. The second processing circuit 11221 may generate the switch control signal PWM2 and current amplitude control information corresponding to the second-color light-emitting device 1112 according to the received pixel data information Gda. The second processing circuit 11221 may generate the switch control signal PWM3 and current amplitude control information corresponding to the third-color light-emitting device 1113 according to the received pixel data information Bda.

Later, the second processing circuit 11221 sends the switch control signal PWM1 to the data drive sub-circuit 11211, sends the switch control signal PWM2 to the data drive sub-circuit 11212, and sends the switch control signal PWM3 to the data drive sub-circuit 11213. Moreover, the current amplitude control information corresponding to each color of light-emitting device is sent to the control circuit 11222. The control circuit 11222 may generate the current control signals DAC1, DAC2 and DAC3 according to the current amplitude control information. Later, the control circuit 11222 may send the current control signal DAC1 to the data drive sub-circuit 11211, send the current control signal DAC2 to the data drive sub-circuit 11212, and send the current control signal DAC3 to the data drive sub-circuit 11213.

The constant-current source circuit 112112 in the data drive sub-circuit 11211 may receive the current control signal DAC1 corresponding to the first-color light-emitting device 1111, and output the constant-amplitude current IL1 corresponding to the current control signal DAC1 according to the received current control signal DAC1. The modulation circuit 112111 may receive the switch control signal PWM1 corresponding to the first-color light-emitting device 1111, and control the first positive pole signal line to form the electrical circuit at least sequentially via the first-color light-emitting device 1111, the output pin O1 of the drive control circuit 40 and the reference signal pin O6 within the working time period according to the effective level (such as the high level) of the received switch control signal PWM1, and the current amplitude in the electrical circuit is the current IL1 generated by the constant-current source circuit 112112, thereby making the first-color light-emitting device 1111 to emit the light. In this way, the switch control signal PWM1 and the current control signal DAC1 may be combined with each other to control the light-emitting brightness and time of the first-color light-emitting device 1111 in the display subframe.

The constant-current source circuit 112122 in the data drive sub-circuit 11212 may receive the current control signal DAC2 corresponding to the second-color light-emitting device 1112, and output the constant-amplitude current IL2 corresponding to the current control signal DAC2 according to the received current control signal DAC2. The modulation circuit 112121 may receive the switch control signal PWM2 corresponding to the second-color light-emitting device 1112, and control the second positive pole signal line to form the electrical circuit at least sequentially via the second-color light-emitting device 1112, the output pin O2 of the drive control circuit 40 and the reference signal pin O6 within the working time period according to the effective level (such as the high level) of the received switch control signal PWM2, and the current amplitude in the electrical circuit is the current IL2 generated by the constant-current source circuit 112122, thereby making the second-color light-emitting device 1112 to emit the light. That is to say, within the duration of the effective level of the switch control signal PWM2, the second-color light-emitting device 1112 may be regarded to be in the working time period. In this way, the switch control signal PWM2 and the current control signal DAC2 may be combined with each other to control the light-emitting brightness and time of the second-color light-emitting device 1112 in the display subframe.

The constant-current source circuit 112132 in the data drive sub-circuit 11213 may receive the current control signal DAC3 corresponding to the third-color light-emitting device 1113, and output the constant-amplitude current IL3 corresponding to the current control signal DAC3 according to the received current control signal DAC3. The modulation circuit 112131 may receive the switch control signal PWM3 corresponding to the third-color light-emitting device 1113, and control the second positive pole signal line to form the electrical circuit at least sequentially via the third-color light-emitting device 1113, the output pin O3 of the drive control circuit 40 and the reference signal pin O6 within the working time period according to the effective level (such as the high level) of the received switch control signal PWM3, and the current amplitude in the electrical circuit is the current IL3 generated by the constant-current source circuit 112132, thereby making the third-color light-emitting device 1113 to emit the light. That is to say, within the duration of the effective level of the switch control signal PWM3, the third-color light-emitting device 1113 may be regarded to be in the working time period. In this way, the switch control signal PWM3 and the current control signal DAC3 may be combined with each other to control the light-emitting brightness and time of the third-color light-emitting device 1113 in the display subframe.

In some embodiments of the present disclosure, as shown in FIG. 14, each drive control circuit 40 may further include: at least one of an interface circuit 1123, a datum voltage circuit 1124, a decoder circuit 1125, a voltage stabilizing circuit 1126 and an electrostatic protection circuit 1127. Of course, the drive control circuit 40 may further include other functional module sub-circuits, which is not limited here. The datum voltage circuit 1124 is configured to determine one fixed datum voltage. The electrostatic protection circuit 1127 is configured to be coupled with the addressing pin O5 and the reference signal pin O6 respectively, so that electrostatic protection can be performed on the power supply voltage VCC input by the addressing pin O5 and the reference voltage VSS input by the reference signal pin O6. The voltage stabilizing circuit 1126 is configured to be coupled with the addressing pin O5 to stabilize the power supply voltage VCC input by the addressing pin O5. The interface circuit 1123 is coupled with the input pin O4. The interface circuit 1123 receives the drive control signal sent by the logic control circuit 30 from the input pin O4 and sends the drive control signal to the decoder circuit 1125. The decoder circuit 1125 is configured to recognize the address information corresponding to the address of the drive control circuit 40 in the drive control signal, and then feed back a data reception signal to the interface circuit 1123. After receiving the data reception signal, the interface circuit 1123 provides the part of the drive control signal corresponding to the address information to the processing control circuit 1122, so that the processing control circuit 1122 generates the light-emitting control signal according to the part of the drive control signal corresponding to the address information. The drive control circuit 40 may receive the power supply voltage VCC through the addressing pin O5 and input the received power supply voltage VCC into the interface circuit 1123. The interface circuit 1123 may decode the received power supply voltage and supply it to the processing control circuit 1122 and the data drive circuit 1121 so as to supply power to the processing control circuit 1122 and the data drive circuit 1121. The interface circuit 1123 may decode the received power supply voltage and supply it to the datum voltage circuit. The datum voltage circuit may generate a reference datum voltage according to the received power supply voltage. The drive control signal may be decoded by the interface circuit 1123 and provided to the second processing circuit 11221 in the processing control circuit 1122, so that the second processing circuit 11221 generates the switch control signal and the current control signal according to the decoded drive control signal.

When the electronic device is a display apparatus and the device includes a light-emitting device, in a drive mode of the display apparatus, the data drive sub-circuit only adopts the switch control signal to adjust and control the brightness of the light-emitting device, but the minimum brightness that can be presented in the display frame in this way cannot reach a target set brightness. At this time, it is necessary to reduce the quantity of the display subframes to reach the target set brightness. However, the quantity of the display subframes decreases, it means reducing of the second frequency, and then the picture will produce a flicker sense. In another drive mode of the display apparatus, the data drive sub-circuit adopts the switch control signal and the current control signal to jointly adjust and control the brightness of the light-emitting device, and the current flowing through the light-emitting device may be reduced through the current control signal, so that the light-emitting device can reach the target set brightness. However, regardless of the drive mode, an internal clock of the system circuit 20 and an internal clock of the logic control circuit 30 cannot be completely consistent, and a crystal oscillator of the logic control circuit 30 itself is unstable, that is, the first frequency may fluctuate, which makes it difficult for the logic control circuit 30 to receive an image signal of each display frame at a fixed cycle. In order to ensure that the reception time of the image signal of each display frame is consistent, the system circuit 20 and the logic control circuit 30 will set a variable time period to adjust a start reception time of the image signal corresponding to each display frame, and the variable time period is called a V-blanking time. By setting the V-blanking time, a sending time and reception time of the system circuit 20 and the logic control circuit 30 may be aligned, so that the logic control circuit 30 receives the image signal corresponding to each display frame at the fixed cycle, and the frequency of the frame refresh signal is controlled to remain unchanged. At the same time, the complete sending of the image signal of each display frame may be guaranteed to prevent the picture from being torn. However, the display apparatus usually displays a black picture within the V-blanking time, which will cause a period of time between the two adjacent display frames to display the black picture, and then the picture will still produce a flicker sense.

Figure 17:
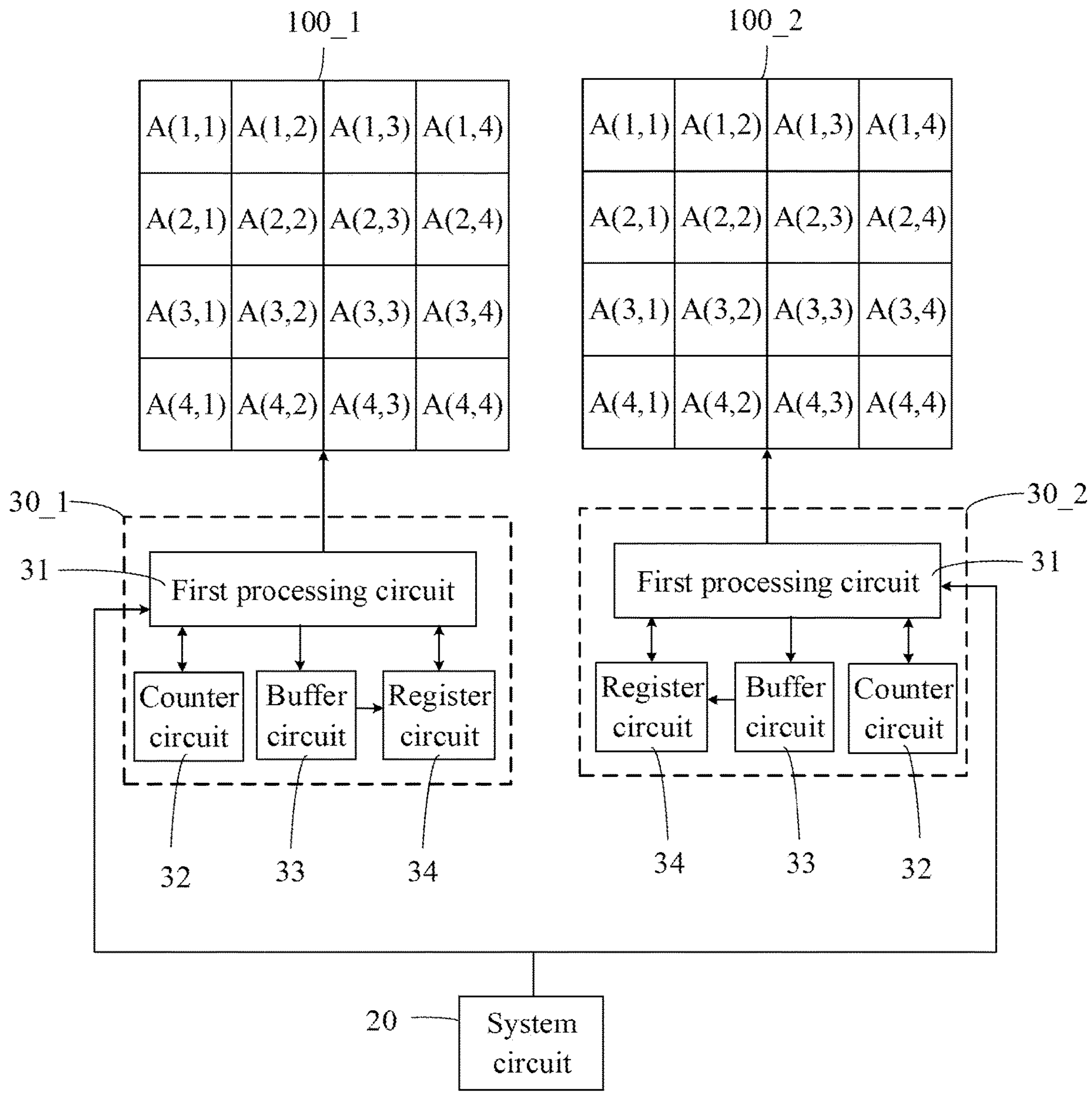
FIG. 17 illustrates some another schematic structural diagrams of an electronic device provided by an embodiment of the present disclosure.

In order to improve the display effect of the display apparatus, as shown in FIG. 17, the logic control circuit 30 provided by the embodiment of the present disclosure includes a counter circuit 32, a buffer circuit and the first processing circuit 31. The first processing circuit 31 is respectively coupled with the input end INP, the counter circuit 32, the buffer circuit 33 and the drive control circuit 40. The counter circuit 32 may count a first number of repeated sending of the $i^{th}$ drive control signal. The buffer circuit 33 may store image signals under certain conditions. The first processing circuit 31 may judge whether the first number reaches a set number and whether the input end INP receives an $(i+1)^{th}$ image signal, and store the $(i+1)^{th}$ image signal to the buffer circuit 33 when it is judged that the first number is less than the set number and the input end INP receives the $(i+1)^{th}$ image signal. It should be noted that the set number is the quantity of the display subframes in one display frame in an ideal state. In the embodiment of the present disclosure, by judging whether the first number reaches the set number and whether the input end INP receives the $(i+1)^{th}$ image signal, the $(i+1)^{th}$ image signal may be stored to the buffer circuit 33 when it is judged that the first number is less than the set number and the input end INP receives the $(i+1)^{th}$ image signal, so that the $(i+1)^{th}$ display frame is opened after each display subframe of the $i^{th}$ display frame is completed. In this way, there is no need to additionally set the V-blanking time, and the quantity of the display subframes will not be omitted, so as to improve brightness uniformity and reduce the flicker sense.

Exemplarily, the set number may be prestored in the logic control circuit 30, and the set number is a quotient of the second frequency and the first frequency. If the first frequency is 60 Hz and the second frequency is 1920 Hz, the set number is 32. If the first frequency is 60 Hz and the second frequency is 38400 Hz, the set number is 64.

In some embodiments of the present disclosure, if a first display frame entered after the electronic device is turned on does not display the picture (for example, display all black), then a second display frame entered after the electronic device is turned on is equivalent to the first display frame displaying the normal picture (for example, a display frame F1 in FIG. 10), and then the sending process of the drive control signal will occur in the first display frame (for example, the display frame F1 in FIG. 10). Therefore, a process that the first processing circuit 31 judges whether the first number reaches the set number and whether the input terminal INP receives the $(i+1)^{th}$ image signal may be a process executed in the second (for example, the display frame F1 in FIG. 10) and subsequent display frames after the electronic device is turned on.

In some embodiments of the present disclosure, the logic control circuit 30 further includes: a register circuit 34. The register circuit 34 is configured to store the $i^{th}$ image signal. The first processing circuit 31 may obtain the $i^{th}$ image signal from the register circuit 34 in the $i^{th}$ display frame, generate the $i^{th}$ drive control signal according to the $i^{th}$ image signal, and generate a horizontal synchronizing signal with the second frequency at the same time. The $i^{th}$ drive control signal is sent to the drive control circuit 40 when a set edge of the horizontal synchronizing signal appears. Exemplarily, when a first falling edge of the generated horizontal synchronizing signal appears, the $i^{th}$ drive control signal da with the address of each drive control circuit 40 coupled thereto is sent to each drive signal line Dn for the first time. When a second falling edge of the generated horizontal synchronizing signal appears, the $i^{th}$ drive control signal da with the address of each drive control circuit 40 coupled thereto is sent to each drive signal line Dn for the second time . . . When a last falling edge of the generated horizontal synchronizing signal appears, the $i^{th}$ drive control signal da with the address of each drive control circuit 40 coupled thereto is sent to each drive signal line Dn for the last time. Exemplarily, the counter circuit 32 is configured to count the number of sending times of the $i^{th}$ drive control signal from 1. That is to say, once the $i^{th}$ drive control signal is sent, the counter circuit 32 counts once and adds one to the previous first number as the updated first number. That is, in the $i^{th}$ display frame, the total number of sending times that the $i^{th}$ drive control signal da is sent from the first time to the last time is the final first number in the $i^{th}$ display frame counted by the counter circuit 32.

In some embodiments of the present disclosure, the first processing circuit 31 sends a count trigger signal to the counter circuit 32 each time when it sends the $i^{th}$ drive control signal. The counter circuit 32 counts in response to the count trigger signal. Exemplarily, when sending the $i^{th}$ drive control signal da with the address of each drive control circuit 40 coupled thereto to each drive signal line Dn for the first time, the first processing circuit 31 sends the count trigger signal to the counter circuit 32. When receiving the count trigger signal sent corresponding to the first time, the counter circuit 32 may count once and update the first number to be 1. When sending the $i^{th}$ drive control signal da with the address of each drive control circuit 40 coupled thereto to each drive signal line Dn for the second time, the first processing circuit 31 also sends the count trigger signal to the counter circuit 32. When receiving the count trigger signal sent corresponding to the second time, the counter circuit 32 may count once and update the first number to be 2. The rest are the same and may be deduced by analogy, which is not repeated here.

In some embodiments of the present disclosure, the horizontal synchronizing signal and the count trigger signal are the same signal. In this way, the horizontal synchronizing signal may be multiplexed as the count trigger signal without additionally generating the count trigger signal, thereby reducing the calculation amount of the first processing circuit 31 and reducing power consumption.

In some embodiments of the present disclosure, the first processing circuit 31 obtains the first number counted by the counter circuit 32 after sends the $i^{th}$ drive control signal each time. In this way, the first processing circuit 31 may judge the relationship between the first number and the set number once after driving one display subframe so as to improve the precision. When judging that the first number is less than the set number and the input terminal INP does not receive the $(i+1)^{th}$ image signal, the first processing circuit 31 continues to send the $i^{th}$ drive control signal to the drive control circuit 40 according to the set edge of the horizontal synchronizing signal.

In some embodiments of the present disclosure, the first processing circuit 31 may store the $(i+1)^{th}$ image signal in the buffer circuit 33 when judging that the first number is less than the set number and the input INP receives the $(i+1)^{th}$ image signal, continue to repeatedly send the $i^{th}$ drive control signal at the second frequency until the first number is equal to the set number, read the $(i+1)^{th}$ image signal from the buffer circuit 33, generate the $(i+1)^{th}$ drive control signal according to the $(i+1)^{th}$ image signal, and repeatedly send the $(i+1)^{th}$ drive control signal at the second frequency to open the $(i+1)^{th}$ display frame. A driving process in the $(i+1)^{th}$ display frame is basically the same as the driving process in the $i^{th}$ display frame, which is not repeated here.

In some embodiments of the present disclosure, the first processing circuit 31 sends a count reset signal to the counter circuit 32 when sending the $(i+1)^{th}$ drive control signal for the first time. The counter circuit 32 starts recounting from 1 in response to the count reset signal to perform the counting process of the first number in the $(i+1)^{th}$ display frame.

In some embodiments of the present disclosure, as shown in FIG. 17, the first processing circuit 31 clears the $i^{th}$ image signal stored in the register circuit 34 when the first number is equal to the set number, and transfers the $(i+1)^{th}$ image signal stored in the buffer circuit 33 into the register circuit 34. In this way, after the set number of display subframes in the $i^{th}$ display frame is completed, the $i^{th}$ image signal stored in the register circuit 34 may be cleared, and the $(i+1)^{th}$ image signal may be taken from the buffer circuit 33 and transferred into the register circuit 34 with the $i^{th}$ image signal cleared. Later, the $(i+1)^{th}$ image signal is obtained from the register circuit 34, the $(i+1)^{th}$ drive control signal is generated according to the $(i+1)^{th}$ image signal, and the $(i+1)^{th}$ drive control signal is repeatedly sent at the second frequency to open the $(i+1)^{th}$ display frame.

In some embodiments of the present disclosure, as shown in FIG. 17, when judging that the first number is equal to the set number and the input end INP does not receive the $(i+1)^{th}$ image signal, the first processing circuit 31 continues to repeatedly send the $i^{th}$ drive control signal at the second frequency, that is, continues to execute the driving process of one display subframe in the $i^{th}$ display frame, and meanwhile, the counter circuit 32 counts until the input end INP receives the $(i+1)^{th}$ image signal. Since after the first number is equal to the set number, the first processing circuit 31 further sends the $i^{th}$ drive control signal at least once, so that the first number counted by the counter circuit 32 is greater than the set number. The first processing circuit 31 clear the $i^{th}$ image signal stored in the register circuit 34 when it is judged that the first number is greater than the set number and the input end INP receives the $(i+1)^{th}$ image signal, and directly store the $(i+1)^{th}$ image signal into the register circuit 34. Later, the $(i+1)^{th}$ drive control signal may be generated according to the $(i+1)^{th}$ image signal, and the $(i+1)^{th}$ drive control signal is repeatedly sent at the second frequency to open the $(i+1)^{th}$ display frame.

In some embodiments of the present disclosure, as shown in FIG. 17, the first processing circuit 31 clears the $i^{th}$ image signal stored in the register circuit 34 when it is judged that the first number is equal to the set number and the input end INP receives the $(i+1)^{th}$ image signal, and directly stores the $(i+1)^{th}$ image signal into the register circuit 34. Later, the $(i+1)^{th}$ image signal is obtained from the register circuit 34, the $(i+1)^{th}$ drive control signal is generated according to the $(i+1)^{th}$ image signal, and the $(i+1)^{th}$ drive control signal is repeatedly sent at the second frequency to open the $(i+1)^{th}$ display frame.

The working process of the electronic device in the embodiment of the present disclosure will be illustrated in detail below in combination with FIG. 4, FIG. 9 to FIG. 12, and FIG. 14 to FIG. 17.

When the electronic device is turned on, the display frame F0 may not display any picture, such as presenting a black picture. At the display frame F0, the t0 phase, the t1 phase, and the t2 phase are executed sequentially. The process from the phase t0 to the phase t2 may be described above, and will not be repeated here.

The system circuit 20 generates a first image signal TX1_1 corresponding to the logic control circuit 30_1 and a first image signal corresponding to the logic control circuit 30_2 after performing a series of processing such as rendering and decoding on an initial signal Cs1 related to the display picture of the display frame F1, meanwhile generates a frame refresh signal FB of the first frequency, enters the display frame F1 when the falling edge of the first pulse of the frame refresh signal FB appears, sends the first image signal TX1_1 to logic control circuit 30_1, and sends the first image signal to the logic control circuit 302. Taking the logic control circuit 30_1 as an example, after receiving the first image signal TX1_1, the first processing circuit 31 in the logic control circuit 30_1 stores the first image signal TX1_1 in the register circuit 34, and obtains the stored first image signal TX1_1 from the register circuit 34, so as to generate the first drive control signal da according to the first image signal TX1_1, and generate the horizontal synchronizing signal HB of the second frequency at the same time.

After the display frame F1 starts, when the falling edge of the first pulse of the horizontal synchronizing signal HB appears, the first processing circuit 31 sends the first drive control signal da including the sub-data information da1-daM to the drive signal line Dn for the first time, and sends the horizontal synchronizing signal HB to the counter circuit 32 at the same time. The counter circuit 32 performs counting once in response to the falling edge of the first pulse of the horizontal synchronizing signal HB, and updates the counted first number to be 1. The first processing circuit 31 obtains the updated first number, judges whether the first number reaches the set number (such as 32) and whether the input end INP receives the corresponding second image signal TX2_1 sent by the system circuit 20, and keeps the register circuit 34 storing the first image signal TX1_1 when the first number is less than the set number (such as 32) and the input end INP does not receive the second image signal TX2_1. The rest are the same and may be deduced by analogy. When the falling edge of the 31st pulse of the horizontal synchronizing signal HB appears, the first processing circuit 31 sends the first drive control signal da including the sub-data information da1-daM to the drive signal line Dn for the 31st time, and sends the horizontal synchronizing signal HB to the counter circuit 32 at the same time. The counter circuit 32 performs counting once in response to the falling edge of the 31st pulse of the horizontal synchronizing signal HB, and updates the counted first number to be 31. After the first number is updated, the first processing circuit 31 obtains the updated first number, judges whether the first number reaches the set number (such as 32) and whether the input end INP receives the corresponding second image signal TX2_1 sent by the system circuit 20, and keeps the register circuit 34 storing the first image signal TX1_1 and stores the second image signal TX2_1 into the buffer circuit 33 when the first number is less than the set number (such as 32) and the input end INP receives the second image signal TX2_1. When the falling edge of the 32nd pulse of the horizontal synchronizing signal HB appears, the first processing circuit 31 sends the first drive control signal da including the sub-data information da1-daM to the drive signal line Dn for the 32nd time, and sends the horizontal synchronizing signal HB to the counter circuit 32 at the same time. The counter circuit 32 performs counting once in response to the falling edge of the 32nd pulse of the horizontal synchronizing signal HB, and updates the counted first number to be 32. After the first number is updated, the first processing circuit 31 obtains the updated first number, judges whether the first number reaches the set number (such as 32), clears the first image signal TX1_1 stored in the register circuit 34 when the first number is equal to the set number (such as 32), and take the second image signal TX2_1 out of the buffer circuit 33 to be transferred into the buffer circuit 34. It is ensured that the quantity of the display subframes in the display frame F1 is 32.

Then, the second drive control signal da is generated according to the second image signal TX2_1, and the horizontal synchronizing signal HB of the second frequency is generated at the same time to enter the display frame F2.

After the display frame F2 starts, when the falling edge of the first pulse of the horizontal synchronizing signal HB appears, the first processing circuit 31 sends the second drive control signal da including the sub-data information da1-daM to the drive signal line Dn for the first time, and sends the count reset signal and the horizontal synchronizing signal HB to the counter circuit 32 at the same time. The counter circuit 32 performs counting once in response to the count reset signal and the falling edge of the first pulse of the horizontal synchronizing signal HB, and updates the counted first number to be 1. After the first number is updated, the first processing circuit 31 obtains the updated first number, judges whether the first number reaches the set number (such as 32) and whether the input end INP receives the corresponding third image signal TX3_1 sent by the system circuit 20, and keeps the register circuit 34 storing the second image signal TX2_1 when the first number is less than the set number (such as 32) and the input end INP does not receive the third image signal TX3_1. The rest are the same and may be deduced by analogy. When the falling edge of the 32nd pulse of the horizontal synchronizing signal HB appears, the first processing circuit 31 sends the second drive control signal da including the sub-data information da1-daM to the drive signal line Dn for the 32nd time, and sends the horizontal synchronizing signal HB to the counter circuit 32 at the same time. The counter circuit 32 performs counting once in response to the falling edge of the 32nd pulse of the horizontal synchronizing signal HB, and updates the counted first number to be 32. The first processing circuit 31 obtains the updated first number, and judges that the first number has reached the set number (such as 32). The first processing circuit 31 further judges whether the input end INP receives the corresponding second image signal TX2_1 sent by the system circuit 20. Because the input end INP has not received the third image signal TX3_1, the register circuit 34 continuously stores the second image signal TX2_1. When the falling edge of the 33rd pulse of the horizontal synchronizing signal HB appears, the first processing circuit 31 sends the second drive control signal da including the sub-data information da1-daM to the drive signal line Dn for the 33rd time, and sends the horizontal synchronizing signal HB to the counter circuit 32 at the same time. The counter circuit 32 performs counting once in response to the falling edge of the 33rd pulse of the horizontal synchronizing signal HB, and updates the counted first number to be 33. The first processing circuit 31 obtains the updated first number, and judges that the first number has reached the set number (such as 32). The first processing circuit 31 further judges whether the input end INP receives the corresponding second image signal TX2_1 sent by the system circuit 20, and clears the second image signal TX2_1 stored in the register circuit 34 and directly stores the third image signal TX3_1 into the buffer circuit 34 when it is judged that the input end INP receives the third image signal TX3_1. Thus the quantity of the display subframes in the display frame F2 is 33, that is, K=33 in the display frame F2.

Later, the stored third image signal TX3_1 is obtained from the register circuit 34 so as to generate the third drive control signal da according to the third image signal TX3_1, and generate the horizontal synchronizing signal HB of the second frequency at the same time to enter the display frame F3.

After the display frame F3 starts, when the falling edge of the first pulse of the horizontal synchronizing signal HB appears, the first processing circuit 31 sends the third drive control signal da including the sub-data information da1-daM to the drive signal line Dn for the first time, and sends the count reset signal and the horizontal synchronizing signal HB to the counter circuit 32 at the same time. The counter circuit 32 performs counting once in response to the count reset signal and the falling edge of the first pulse of the horizontal synchronizing signal HB, and updates the counted first number to be 1. After the first number is updated, the first processing circuit 31 obtains the updated first number, and judges whether the first number reaches the set number (such as 32) and whether the input end INP receives the corresponding fourth image signal sent by the system circuit 20. When it is judged that the first number is less than the set number (such as 32) and the input end INP does not receive the fourth image signal, the register circuit 34 continuously stores the third image signal TX3_1. The rest are the same and may be deduced by analogy. When the falling edge of the 32nd pulse of the horizontal synchronizing signal HB appears, the first processing circuit 31 sends the third drive control signal da including the sub-data information da1-daM to the drive signal line Dn for the 32nd time, and sends the horizontal synchronizing signal HB to the counter circuit 32 at the same time. The counter circuit 32 performs counting once in response to the falling edge of the 32nd pulse of the horizontal synchronizing signal HB, and updates the counted first number to be 32. After the first number is updated, the first processing circuit 31 obtains the updated first number, and judges that the first number has reached the set number (such as 32). The first processing circuit 31 further judges whether the input end INP receives the corresponding fourth image signal sent by the system circuit 20, and clears the third image signal TX3_1 stored in the register circuit 34 and directly stores the fourth image signal into the buffer circuit 34 when it is judged that the input end INP receives the fourth image signal. Thus the quantity of the display subframes in the display frame F3 is 32, that is, K=32 in the display frame F3. Later, the stored fourth image signal is obtained from the register circuit 34 so as to generate the fourth drive control signal according to the fourth image signal, and generate the horizontal synchronizing signal HB of the second frequency at the same time to enter the display frame F4. The rest are the same and may be deduced by analogy.

It should be noted that the above display frame F1 to display frame F3 may be the three consecutive display frames or three inconsecutive display frames in practical application. For example, among the plurality of consecutive display frames in practical application, one display frame is the display frame F1 in the present application, then one display frame after the plurality of display frames is the display frame F2 in the present application, and then one display frame after the plurality of display frames is the display frame F3 in the present application. Or, among the plurality of consecutive display frames in practical application, the two adjacent display frames are the display frames F1 and F2 in the present application, and then one display frame after the plurality of display frames is the display frame F3 in the present application. Or, among the plurality of consecutive display frames in practical application, one display frame is the display frame F1 in the present application, and then the two adjacent display frames after the plurality of display frames are the display frames F2 and F3 in the present application.

An embodiment of the present disclosure further provides a display driving method. The display driving method may be applied to the above circuit component 10, and the display driving method may include: an $i^{th}$ drive control signal is generated based on an $i^{th}$ image signal, and the $i^{th}$ drive control signal is repeatedly sent at a second frequency, wherein the $i^{th}$ drive control signal is configured to control a current flowing through at least one signal channel end ONP. It should be noted that the working principle and specific implementation of the display driving method are basically the same as the working principle and specific implementation of the circuit component 10 in the above embodiment. Therefore, the working method of the display driving method may be implemented by referring to the specific implementation of the circuit component 10 in the above embodiment, which is not repeated here. The skilled in the art should understand that the embodiment of the present disclosure may be provided as a method, a system or a computer program product. Therefore, the present disclosure can adopt forms of full hardware embodiments, full software embodiments, or embodiments combining software and hardware aspects. Moreover, the present disclosure can adopt a form of the computer program products implemented on one or more computer available storage mediums (including but are not limited to a disk memory, a CD-ROM, an optical memory and the like) containing computer available program codes.

The present disclosure is described with reference to flow diagrams and/or block diagrams of the methods, the devices (systems), and computer program products according to the embodiments of the present disclosure. It should be understood that each flow and/or block in the flow diagrams and/or the block diagrams and combinations of the flows and/or the blocks in the flow diagrams and/or the block diagrams can be implemented by computer program instructions. These computer program instructions may be provided to a second processing circuit of a general-purpose computer, a special-purpose computer, an embedded processing machine or other programmable data processing devices to generate a machine, such that the instructions, when executed by the second processing circuit of the computer or other programmable data processing devices, generate an apparatus for implementing functions specified in one or more flows in the flow diagrams and/or one or more blocks in the block diagrams.

These computer program instructions may also be stored in a computer readable memory which can guide the computer or other programmable data processing devices to work in a specific mode, thus the instructions stored in the computer readable memory generates an article of manufacture that includes a commander apparatus that implement the functions specified in one or more flows in the flow diagrams and/or one or more blocks in the block diagrams.

These computer program instructions may also be loaded to the computer or other programmable data processing devices, so that a series of operating steps are executed on the computer or other programmable devices to generate computer-implemented processing, such that the instructions executed on the computer or other programmable devices provide steps for implementing the functions specified in one or more flows in the flow diagrams and/or one or more blocks in the block diagrams.

Although the preferred embodiments of the present disclosure have been described, those skilled in the art can make additional alterations and modifications on these embodiments once they know the basic creative concept. Therefore, the appended claim intends to be explained as including the preferred embodiments and all alterations and modifications falling within the scope of the present disclosure.

Apparently, those skilled in the art can make various modifications and variations to the embodiment of the present disclosure without departing from the spirit and scope of the embodiment of the present disclosure. In this way, if these modifications and variations of the embodiments of the present disclosure fall within the scope of the claims of the present disclosure and their equivalent art, the present disclosure also intends to include these modifications and variations.

What is claimed is:

1. A circuit component, comprising:

an input end and at least one signal channel end, wherein the input end is configured to receive an $i^{th}$ image signal at a first frequency, and i is a positive integer; and the circuit component further comprises a logic control circuit configured to generate an $i^{th}$ drive control signal based on the $i^{th}$ image signal and repeatedly send the $i^{th}$ drive control signal at a second frequency, wherein the $i^{th}$ drive control signal is configured to control a current flowing through the at least one signal channel end;

wherein the logic control circuit comprises:

a counter circuit configured to count a first number of repeated sending of the $i^{th}$ drive control signal;

a buffer circuit configured to store an image signal; and a first processing circuit coupled with the input end, the counter circuit and the buffer circuit; wherein the first processing circuit is configured to: judge whether the first number reaches a set number and whether the input end receives an $(i+1)^{th}$ image signal, and store the $(i+1)^{th}$ image signal to the buffer circuit in response to the first number being less than the set number and the input end receiving the $(i+1)^{th}$ image signal.

2. The circuit component according to claim 1, wherein the first processing circuit is further configured to: continue to repeatedly send the $i^{th}$ drive control signal at the second frequency until the first number is equal to the set number, and read the $(i+1)^{th}$ image signal from the buffer circuit, in response to the first number being less than the set number and the input end receiving the $(i+1)^{th}$ image signal.

3. The circuit component according to claim 2, wherein the logic control circuit further comprises:

a register circuit configured to store the $i^{th}$ image signal; and the first processing circuit is further configured to: clear the $i^{th}$ image signal stored in the register circuit, and transfer the $(i+1)^{th}$ image signal stored in the buffer circuit into the register circuit, in response to the first number being equal to the set number.

4. The circuit component according to claim 1, wherein the first processing circuit is further configured to: continue to repeatedly send the $i^{th}$ drive control signal at the second frequency until the input end receives the $(i+1)^{th}$ image signal, in response to the first number being equal to the set number and the input end not receiving the $(i+1)^{th}$ image signal.

5. The circuit component according to claim 4, wherein the first processing circuit further comprises:

the register circuit configured to store the $i^{th}$ image signal; and the first processing circuit is further configured to: clear the $i^{th}$ image signal stored in the register circuit, and directly store the $(i+1)^{th}$ image signal into the register circuit, in response to the first number being greater than the set number and the input end receiving the $(i+1)^{th}$ image signal.

6. The circuit component according to claim 1, wherein the first processing circuit further comprises:

the register circuit configured to store the $i^{th}$ image signal; and the first processing circuit is further configured to: clear the $i^{th}$ image signal stored in the register circuit, and store the $(i+1)^{th}$ image signal into the register circuit, in response to the first number being equal to the set number and the input end receiving the $(i+1)^{th}$ image signal.

7. The circuit component according to claim 1, wherein the counter circuit is configured to count the number of sending times of the $i^{th}$ drive control signal from 1.

8. The circuit component according to claim 1, wherein the set number is equal to a quotient of the second frequency divided by the first frequency.

9. The circuit component according to claim 8, wherein the first processing circuit is further configured to: send the $i^{th}$ drive control signal and send a count trigger signal to the counter circuit; and send a count reset signal to the counter circuit in response to the $(i+1)^{th}$ drive control signal is first sent; and the counter circuit is further configured to count in response to the count trigger signal and to recount from 1 in response to the count reset signal.

10. The circuit component according to claim 1, wherein the first processing circuit is further configured to: obtain the first number counted by the counter circuit after sending the $i^{th}$ drive control signal each time.

11. The circuit component according to claim 1, further comprising a drive control circuit; wherein the drive control circuit comprises an input pin and an output pin, the logic control circuit is coupled with the input pin of the drive control circuit, the input pin is configured to receive the $i^{th}$ drive control signal at the second frequency, and the output pin is the signal channel end of the circuit component.

12. The circuit component according to claim 11, wherein the first processing circuit is further configured to: generate a horizontal synchronizing signal and send the $i^{th}$ drive control signal to the drive control circuit in response to a set edge of the horizontal synchronizing signal appearing, wherein the set edge is one of a rising edge or a falling edge.

13. The circuit component according to claim 12, wherein the horizontal synchronizing signal and the count trigger signal are a same signal.

14. An electronic device, comprising the circuit component according to claim 1.

15. The electronic device according to claim 14, wherein the logic control circuit comprises:

a counter circuit configured to count a first number of repeated sending of the $i^{th}$ drive control signal;

a buffer circuit configured to store an image signal; and a first processing circuit coupled with the input end, the counter circuit and the buffer circuit; wherein the first processing circuit is configured to: judge whether the first number reaches a set number and whether the input end receives an $(i+1)^{th}$ image signal, and store the $(i+1)^{th}$ image signal to the buffer circuit in response to the first number being less than the set number and the input end receiving the $(i+1)^{th}$ image signal.

16. The electronic device according to claim 15, wherein the first processing circuit is further configured to: continue to repeatedly send the $i^{th}$ drive control signal at the second frequency until the first number is equal to the set number, and read the $(i+1)^{th}$ image signal from the buffer circuit, in response to the first number being less than the set number and the input end receiving the $(i+1)^{th}$ image signal.

17. The electronic device according to claim 16, wherein the logic control circuit further comprises:

a register circuit configured to store the $i^{th}$ image signal; and the first processing circuit is further configured to: clear the $i^{th}$ image signal stored in the register circuit, and transfer the $(i+1)^{th}$ image signal stored in the buffer circuit into the register circuit, in response to the first number being equal to the set number.

18. The electronic device according to claim 15, wherein the first processing circuit is further configured to: continue to repeatedly send the $i^{th}$ drive control signal at the second frequency until the input end receives the $(i+1)^{th}$ image signal, in response to the first number being equal to the set number and the input end not receiving the $(i+1)^{th}$ image signal.

19. A driving method, applied to the circuit component according to claim 1, wherein the driving method comprises:

generating the $i^{th}$ drive control signal based on the $i^{th}$ image signal and repeatedly sending the $i^{th}$ drive control signal at the second frequency.

* * * * *